(12) United States Patent (10) Patent No.: US 12,191,447 B2
Mackanic et al. (45) Date of Patent: Jan. 7, 2025

(54) GEL ELECTROLYTE COMPOSITION FOR A BATTERY AND A METHOD OF IMPLEMENTATION

(71) Applicant: Anthro Energy, Inc., San Jose, CA (US)

(72) Inventors: David George Mackanic, San Jose, CA (US); Joseph K. Papp, San Jose, CA (US)

(73) Assignee: Anthro Energy, Inc., San Jose, CA (US)

( * ) Notice: Subject to any disclaimer, the term of this patent is extended or adjusted under 35 U.S.C. 154(b) by 0 days.

(21) Appl. No.: 18/443,716

(22) Filed: Feb. 16, 2024

(65) Prior Publication Data

US 2024/0283017 A1 Aug. 22, 2024

Related U.S. Application Data

(60) Provisional application No. 63/485,332, filed on Feb. 16, 2023.

(51) Int. Cl.
*H01M 10/0565* (2010.01)
*H01M 4/62* (2006.01)
*H01M 4/02* (2006.01)

(52) U.S. Cl.
CPC ....... *H01M 10/0565* (2013.01); *H01M 4/622* (2013.01); *H01M 4/625* (2013.01); *H01M 2004/027* (2013.01); *H01M 2004/028* (2013.01); *H01M 2300/0082* (2013.01); *H01M 2300/0085* (2013.01)

(58) Field of Classification Search
None
See application file for complete search history.

(56) References Cited

U.S. PATENT DOCUMENTS

| 5,549,987 A | 8/1996 | Venugopal et al. |
| 7,026,071 B2 | 4/2006 | Mayes et al. |
| 7,097,940 B2 | 8/2006 | Uetani et al. |

(Continued)

FOREIGN PATENT DOCUMENTS

| JP | 2001307776 A | 11/2001 |
| JP | 2002511179 A | 4/2002 |

(Continued)

OTHER PUBLICATIONS

Hosseinioun, A., Paillard, E.—In situ crosslinked PMMA gel electrolyte from a low viscosity precursor solution for cost-effective, long lasting and sustainable lithium-ion batteries, Journal of Membrane Science, 594 (2020) 117546 (Year: 2020).*

(Continued)

*Primary Examiner* — Anca Eoff
(74) *Attorney, Agent, or Firm* — Jeffrey Schox; Randy Mehlenbacher

(57) ABSTRACT

A method can include: receiving a gel electrolyte precursor solution comprising a polymeric precursor (such as monomers or oligomers), an initiator, and a plasticizer; adding the gel electrolyte precursor solution to a battery stack; wetting the battery stack with the gel electrolyte precursor solution; and curing the gel electrolyte precursor to form a covalently bonded gel electrolyte network interspersed throughout the battery stack.

28 Claims, 16 Drawing Sheets

(56) References Cited

U.S. PATENT DOCUMENTS

| | | | |
|---|---|---|---|
| 7,651,820 B2 | 1/2010 | Shibuya | |
| 8,323,838 B2 | 12/2012 | Shembel et al. | |
| 9,130,242 B2 | 9/2015 | Jeon et al. | |
| 9,843,073 B2 | 12/2017 | Yoneda et al. | |
| 10,090,556 B2 | 10/2018 | Rho et al. | |
| 10,256,497 B2 | 4/2019 | Shinmei et al. | |
| 10,276,891 B2 | 4/2019 | Barde et al. | |
| 10,326,166 B2 | 6/2019 | Yang et al. | |
| 10,566,658 B2 | 2/2020 | Solan et al. | |
| 10,615,398 B2 | 4/2020 | Oh et al. | |
| 10,707,527 B2 | 7/2020 | Lee et al. | |
| 11,784,315 B2 | 10/2023 | Jung et al. | |
| 2002/0048706 A1 | 4/2002 | Mayes et al. | |
| 2003/0108799 A1 | 6/2003 | Lascaud et al. | |
| 2005/0136093 A1* | 6/2005 | Denk | A61L 31/16 424/426 |
| 2007/0045596 A1* | 3/2007 | King | C08J 7/0427 252/582 |
| 2008/0076026 A1 | 3/2008 | Ryu et al. | |
| 2009/0029250 A1 | 1/2009 | Stebani et al. | |
| 2009/0317723 A1* | 12/2009 | Yu | H01M 10/0565 429/302 |
| 2010/0092870 A1 | 4/2010 | Shembel et al. | |
| 2015/0056517 A1 | 2/2015 | Zhou et al. | |
| 2015/0255227 A1 | 9/2015 | Chen et al. | |
| 2016/0268627 A1 | 9/2016 | Lee et al. | |
| 2017/0279122 A1 | 9/2017 | Helms et al. | |
| 2018/0170009 A1* | 6/2018 | Kuniyasu | B32B 27/34 |
| 2019/0010288 A1* | 1/2019 | Lee | A61L 27/3804 |
| 2020/0017649 A1 | 1/2020 | Agrawal et al. | |
| 2021/0020944 A1 | 1/2021 | Tu et al. | |
| 2021/0359342 A1 | 11/2021 | Park et al. | |
| 2022/0085410 A1 | 3/2022 | Ahn et al. | |
| 2022/0115692 A1 | 4/2022 | Mackanic et al. | |
| 2022/0344712 A1 | 10/2022 | Su et al. | |
| 2024/0283016 A1 | 8/2024 | Mackanic et al. | |

FOREIGN PATENT DOCUMENTS

| | | | |
|---|---|---|---|
| JP | 2004059865 A | 2/2004 | |
| WO | WO-2020060293 A1 * | 3/2020 | C08G 77/442 |
| WO | 2020096343 A1 | 5/2020 | |
| WO | 2022255598 A1 | 12/2022 | |
| WO | 2023063727 A1 | 4/2023 | |
| WO | 2023090449 A1 | 5/2023 | |

OTHER PUBLICATIONS

Lithium difluoro(oxalato_borate, National Library of Medicine, available online at https://pubchem.ncbi.nlm.nih.gov/compound/Lithium-difluoro_oxalato_borate, date unknown.*

"Acrylate Monomers and Oligomers", Acrylate Monomers and Oligomers, NAGASE America LLC, first downloaded Feb. 15, 2024.

"Advanced Performance UV/EB-Curing Oligomers", Bomar, https://bomar-chem.com/products/oligomers.

"Diurethane dimethacrylate, mixture of isomers", https://www.sigmaaldrich.com/US/en/product/aldrich/436909, first downloaded Feb. 14, 2024.

"Oligomer", Study Smarter, https://www.studysmarter.co.uk/explanations/engineering/materials...consists%20of%20a%20few,typically%20between%20three%20and%20ten, first downloaded Feb. 14, 2024.

"Oligomer methacrylate resins", Arkem Global website, https://sartomer.arkema.com/en/products/product-families/specialty-methacrylates-resins/oligomers-methacrylate/, fist downloaded Feb. 14, 2024.

Chae, Wookil , et al., "A Brief Review of Gel Polymer Electrolytes Using In Situ Polymerization for Lithium-ion Polymer Batteries", Polymers 2023, 15, 803. https://doi.org/10.3390/ polym 15040803, published Feb. 5, 2023.

Gnanaraj, J.S. , et al., "LiPF3 (CF2CF3)3: A Salt for Rechargeable Lithium Ion Batteries", Journal of The Electrochemical Society, 150 (4) A445-A454 (2003), Available electronically Feb. 28, 2003.

Guo, Liya, et al., "Degradation in lithium ion battery current collectors", J. Phys. Energy 3 (2021) 032015, published Jul. 15, 2021.

Kaden, Nicolaj , et al., "A Systematic Literature Analysis on Electrolyte Filling and Wetting in Lithium-Ion Battery Production", Batteries2023,9,164. https:// doi.org/10.3390/batteries9030164, published Mar. 9, 2023.

Lopez, Jeffrey , et al., "Designing polymers for advanced battery chemistries", Nat Rev Mater 4, 312-330 (2019), Published: Apr. 3, 2019.

Mackanic, David G., et al., "Crosslinked Poly(tetrahydrofuran) as a Loosely Coordinating Polymer Electrolyte", Adv. Energy Mater. 2018, 1800703.

Mackanic, David G., "Decoupling of mechanical properties and ionic conductivity in supramolecular lithium ion conductors", Nature Communications, (2019) 10:5384, published Nov. 26, 2019.

Mackanic, David G., et al., "Enabling Deformable and Stretchable Batteries", Adv. Energy Mater. 2020, 2001424.

Schmidt, M. , et al., "Lithium fluoroalkylphosphates: a new class of conducting salts for electrolytes for high energy lithium-ion batteries", Journal of Power Sources 97-98 (2001) 557-560, received Jun. 20, 2000; accepted Dec. 30, 2000.

Swiderski, Kenneth W., et al., "Urethane Acrylate Oligomers and UV/EB Curing: A Disruptive Technology for Traditional Urethane Prepolymers", Bomar, https://bomar-chem.com/content/download/312/file/BWP013DA%20Urethane%20Acrylate%20Oligomers%20and%20UV%20EB%20Curing%20White%20Paper.pdf, first downloaded Feb. 14, 2024, bomar-chem.com was first indexed by Google in Oct. 2020.

Yang, Junfeng , et al., "Self-healing strategy for Si nanoparticles towards practical application as anode materials for Li-ion batteries", Electrochemistry Communications 87 (2018) 22-26, available online Dec. 21, 2017.

Zhou, Binghua , et al., "Self-Healing Polymer Electrolytes Formed via Dual-Networks: A New Strategy for Flexible Lithium Metal Batteries", Chem. Eur. J. 2018, 24, 19200-19207.

Zhang, Guangzhao , et al., "A Quadruple-Hydrogen-Bonded Supramolecular Binder for High-Performance Silicon Anodes in Lithium-Ion Batteries", Small, vol. 14, No. 29, Jun. 22, 2018, p. 1801189.

McGuire, Matthew , et al., "Flexibility Battery", U.S. Appl. No. 18/779,553, filed Jul. 22, 2024.

Wood, David L., et al., "Prospects for reducing the processing cost of lithium ion batteries", Journal of Power Sources 275 (2015) 234-242, Nov. 6, 2014.

Wu, Qian , et al., "Flexible Nanocomposite Polymer Electrolyte Based on UV-Cured Polyurethane Acrylate for Lithium Metal Batteries", ACS Sustainable Chem. Eng. 2021, 9, 5631-5641, Apr. 12, 2021.

"Battery Tab Material for Lithium-ion Cell Manufactures, Lithium-ion Battery Tabs", https://www.avocetsteel.co.uk/applications/li-ion-batteries/avocet-battery-tabs/, first downloaded Jun. 18, 2024.

"Battery Tab Materials for Lithium-Ion Cell Manufacturers", Targay, https://www.targray.com/li-ion-battery/packaging-materials/tabs, first downloaded Jun. 13, 2024.

"Causes and effects of tab folding during lithium battery manufacturing process", Topower, https://www.sztaipu.com/techcorner/other/causes-and-effects-of-tab-folding-during-lithium-battery-manufacturing-process/, Dec. 18, 2023.

"Flexible Battery", Softmatter, Toolkit, https://softmatter.io/shop/flexible-battery/, first downloaded Jun. 13, 2024.

"Flexible Lithium Polymer Battery", Jenax, https://jenaxinc.com/products/batteries/, first downloaded Jun. 13, 2024.

"Introducing FlexFrame", QuantumScape, https://www.quantumscape.com/blog/introducing-flexframe/, Jan. 16, 2024.

\* cited by examiner

Cycle life of tough polymer electrolyte multi-layer pouch cell (200 mAh) at 25°C

GEL ELECTROLYTE COMPOSITION FOR A BATTERY AND A METHOD OF IMPLEMENTATION

CROSS-REFERENCE TO RELATED APPLICATIONS

This application claims the benefit of U.S. Provisional Application No. 63/485,332 filed 16 Feb. 2023, which is incorporated in its entirety by this reference.

TECHNICAL FIELD

This invention relates generally to the field of ionically conductive compositions, and more specifically to a new and useful composition and method for production and implementation of a tough polymer electrolyte.

BACKGROUND

Batteries have become an increasingly integral part of society, embedded in almost every aspect our lives. Batteries essentially provide the energy for the functionality of nearly every automated device at hand, wherein, very often, the limitation of developing technology falls on the limitations of battery itself. With the increasing desired capability of portable devices, comes the necessity for more stable, more environmentally resilient, and more powerful batteries that can be form fit to users and objectives for increased portability.

Thus, there is a need in the field of batteries to create new and useful battery composition and method for creating batteries with properties such as increased energy density, increased safety, and flexibility. Through the incorporation of a tough and ionically conductive polymer electrolyte for a battery, this invention provides such a new and useful composition and method.

DESCRIPTION OF THE EMBODIMENTS

The following description of the embodiments of the invention is not intended to limit the invention to these embodiments but rather to enable a person skilled in the art to make and use this invention.

1. Overview

Figure 8:
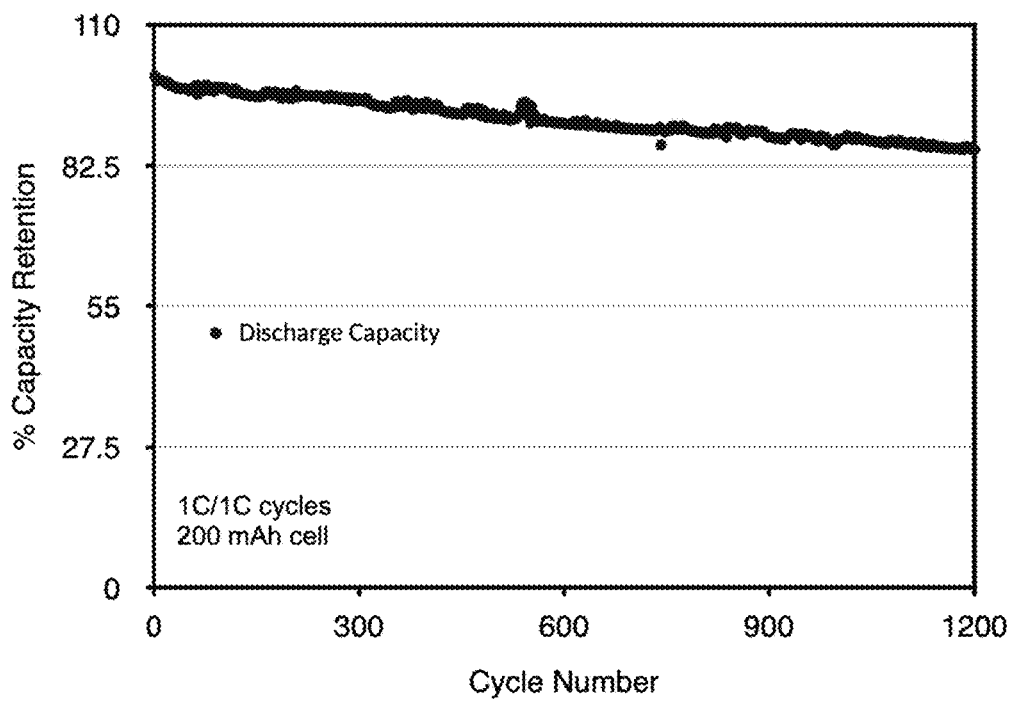
FIG. 8 is a graph demonstrating the 1C/1C cycle life of a Li-ion pouch battery utilizing an example tough polymer electrolyte composition.
Figure 9:
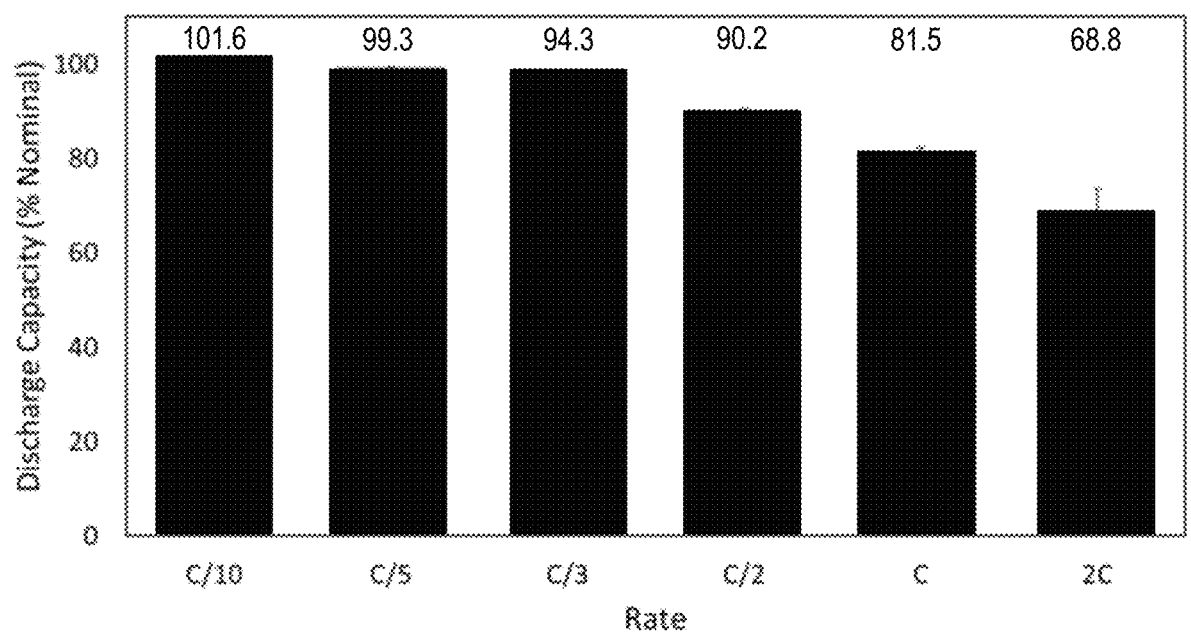
FIG. 9 is a graph demonstrating the rate capability in the range of C/10 to 2C of a Li-ion pouch battery utilizing an example tough polymer electrolyte composition.
Figure 10:
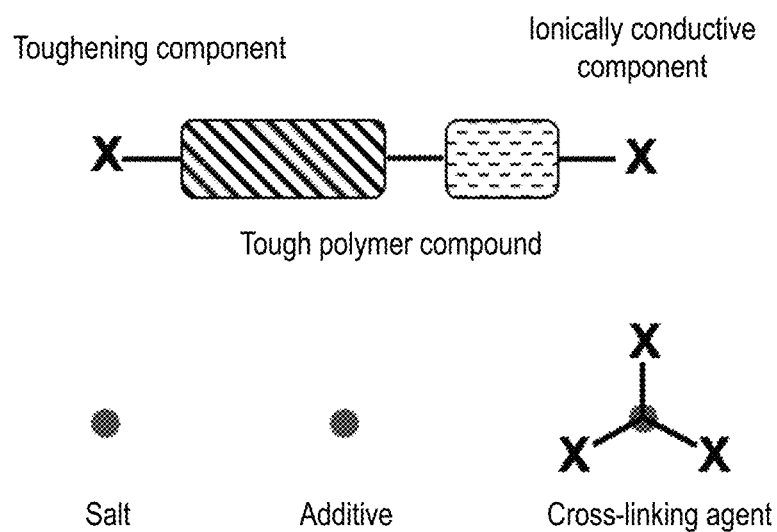
FIGS. 10-14 are schematics of different example formulation types for the composition.
Figure 11:
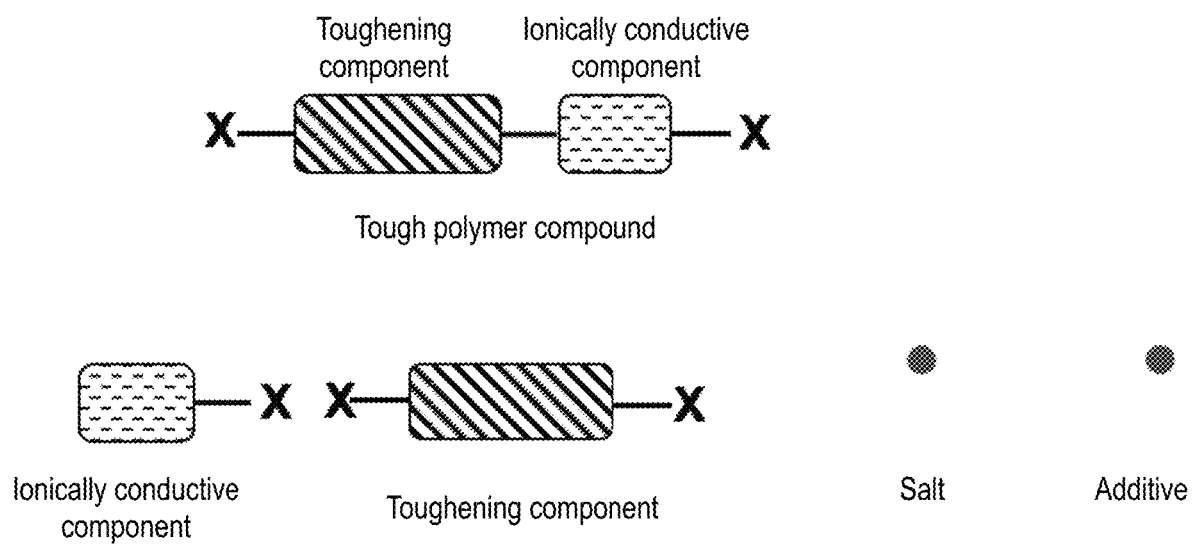
Figure 12:
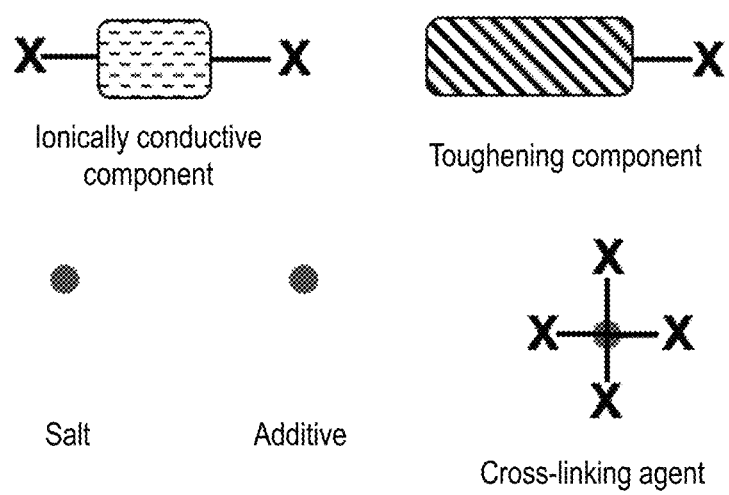
Figure 13:
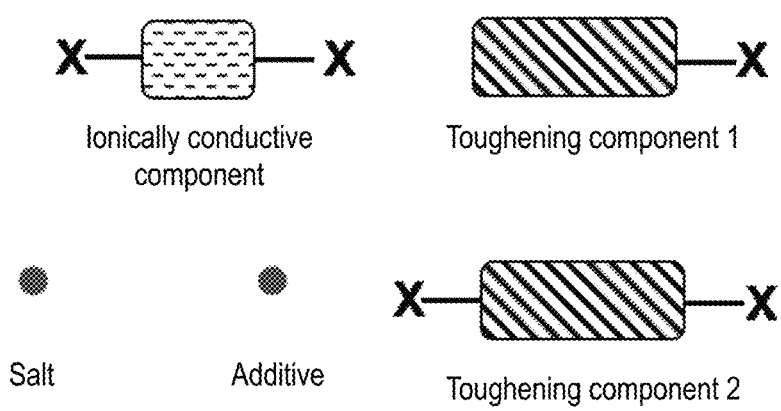
Figure 14:
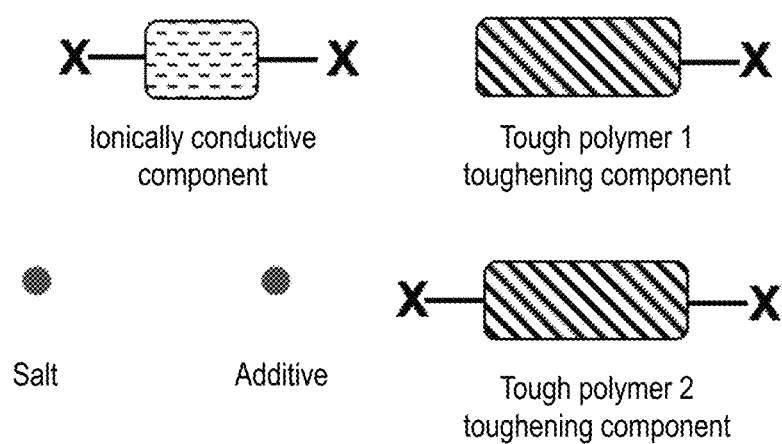

A composition and method for production and implementation of an electrolyte polymer in a battery includes: preparing one or more polymer electrolyte precursor solutions, wherein the electrolyte precursor includes monomer and/or oligomer subunits of at least one polymer; distributing the polymer electrolyte precursor solution(s) through a battery volume, enabling battery components to be wetted by the solution(s); and activating (e.g., curing) the polymer electrolyte precursor solution(s), thereby polymerizing the monomer and/or oligomer subunits of the at least one polymer. The polymer electrolyte solution(s) may include: a gel and/or polymer, with ionically conductive oligomer subcomponents that could include and/or promote dynamic bonding interactions (e.g., H-bonds, ion pairing, metal-chelating, host-guest interactions, etc.) that are then polymerized when the solution is cured, a plasticizer (e.g., a solvent; an additive; a salt such as a lithium based salt for a lithium ion battery, a sodium based salt for a sodium ion battery, etc.; etc.), a polymerization initiator, a polymerization inhibitor, and/or any suitable component. Note that while the term plasticizer is used, the examples of plasticizer may not function as a plasticizer for all polymers but can still be included (e.g., a salt, solvent, additive, etc. can be included that does not soften and/or increase a flexibility of the cured polymer). The composition and method function to build and incorporate a polymer (e.g., gel) based electrolyte within a battery cell, wherein the polymer based electrolyte can function as the sole battery electrolyte or a supplementary battery electrolyte. As shown in FIG. 8, for an example electrolyte formulation, a battery incorporating the electrolyte may maintain over 80% of its initial capacity after 1000 battery cycles. The composition and method may enable battery flexibility and may provide improved battery functionality in one or more ways as described herein.

The composition and method provide a stable ionically conductive medium, for use with a wide range of general use and specific use batteries. That is, the composition and method may provide a stable electrolyte, that may be incorporated into any volume to function as an ionically conductive medium. In this case, a tough polymer electrolyte is one that demonstrates an enhanced modulus, extensibility, and/or ultimate stress (e.g., relative to a comparable battery with an electrolyte that is identical except excluding the polymer). The method enables incorporation and polymerization of the electrolyte directly into a battery providing improved functionality through stability and improved structural integrity as compared to electrolytes incorporated in more traditional means.

In one variant, the composition and method can be particularly useful for the production of form fitting batteries, wherein the composition and method enable efficient incorporation of battery components in flexible form-fitting battery devices. In this manner the system and method may be useful for the production of smart sensors, medical devices, flexible electronics, defense systems, and/or gadgets of unprecedented functionality that have more stringent geometric limits. The composition and method may also provide a highly stable electrolyte that is particularly useful for incorporation with structural batteries and high-energy density cells.

The composition and method may provide a number of potential benefits. The composition and method are not limited to always providing such benefits and are presented only as exemplary representations for how the composition and method may be put to use. The list of benefits is not intended to be exhaustive and other benefits may additionally or alternatively exist.

As part of the method for incorporation of the electrolyte composition, the composition and method provide the potential benefit of simplified and scalable battery construction wherein, more "complex" batteries may be produced using simpler and existing manufacturing processes.

The composition and method provide the potential benefit of the production a stable electrolyte composition, where this electrolyte can have greater stability and tunability as compared to current conventional (e.g., liquid; solid such as ceramics, nongel polymeric electrolyte, etc.; etc.) electrolytes. More specifically, the electrolyte composition may provide the potential benefit of less flammable batteries with little, to no, leakage of solvent and/or other electrolyte components when punctured or cut.

One potential benefit the electrolyte composition (e.g., the cured polymeric electrolyte) is that it provides better structural integrity to current batteries using other conventional electrolytes. Due to the interfacial tension of the electrolyte composition, the electrolyte composition provides the potential benefit of removing the requirement of external pressure to prevent battery layer slippage, (although external pressure may still be desired or implemented for other reasons).

Additionally, this adhesive property of the electrolyte composition provides the potential benefit of enabling flexibility within a battery. That is, the adhesive property may allow for flexibility by eliminating the need for uniform external pressure to be applied to a battery cell.

The electrolyte composition may additionally provide a continuous interface along battery components (e.g., between electrodes, through a separator, etc.). This may provide the potential benefit of reduced interfacial impedance between battery layers.

The polymer electrolyte further provides an electrolyte that is more stable as compared to other (e.g., liquid) electrolytes. Additionally through in-situ incorporation of the polymer electrolyte, a superior solid electrolyte interphase (SEI) is formed within the battery that potentially provides even greater stability and ionic conductivity.

Another potential benefit of the system and method are that they may provide volume stabilization. The combination of mechanical properties and ionic conductivity of the polymer electrolyte described herein can help to reduce fracture and/or instabilities associated with applications involving battery flexure as well as high volume change anodes. Examples of such volume change anodes include Si and $SiO_x$ based materials. Benefits for volume change anodes may include reduced electrode cracking, reduced particle fracture, improved interfacial stability, and/or lowered interfacial resistance.

Another potential benefit of the composition and method is that they provide flexible battery implementation. For example, the implementation of a tough and ionically conductive polymer electrolyte, the system and method can enable construction of flexible batteries with improved interfacial adhesion and enhanced electrode stability.

Additionally, the flexible battery enables the benefit of incorporating battery components in bent regions of devices that would typically be considered "dead space", thereby potentially increasing battery capacity for a device. Non-limiting examples of such regions can include a car top (e.g., car roof or more general any vehicle roof or other curved surface of a vehicle including doors, hoods, trunks, etc.), watch bands, glasses (e.g., temples, bridges, end pieces, hinges, etc.), and/or other suitable regions of electronic devices (e.g., wearables, vehicles, powertools, medical devices, computers, mobile phones, cameras, micromobility, consumer electronics, ioT devices, etc.).

As another potential benefit, a flexible battery can retain capacity over bending of the battery. That is, the system and method enable a battery, that over thousands (e.g., 1000, 1500, 2000, 3000, 4000, 5000, 7500, 8000, 9000, 10000, 20000, 50000, etc.) of folding actions, maintains battery function with little to no loss (e.g., the action of folding results in a less than 90% change in capacity for any folded state or intermediate folding state) in battery capacity.

2. Composition

A polymer electrolyte composition (e.g., upon curing) includes: a polymer component and one or more plasticizers (e.g., solvent(s), salt(s), additive(s), etc.). The polymer component (e.g., cured polymer component) can include dynamic crosslinking groups, covalent bonds, and/or other suitable groups. These polymer components can enable dynamic crosslinking via hydrogen bonding, urethane domains, ionic chelating, ion pairing interactions, and/or through other approaches (e.g., such as dynamic covalent bonding, mechanical bonds, etc.). The polymer component (e.g., oligomer) can also contain additional covalent crosslinking functional groups including acrylates, methacrylates, cyanoacrylates, epoxies, thiol, imide, etc. The composition functions as an ionically conductive medium, or (e.g., prior to curing) a conductive medium precursor, that enables flow of ions particularly for use within a battery (or other charge storage device such as a capacitor, supercapacitor, etc.). More specifically, in some variations the composition may function as a battery electrolyte or in conjunction with a battery electrolyte (i.e., a complementary battery electrolyte). This electrolyte may be tunable, such that may be incorporated in a wide range of batteries (e.g., flexible batteries, structural batteries, high-energy batteries, etc.).

As used herein, the term component is used to generally refer to at least one compound with the properties of that component. For example, the polymer component refers to at least one polymer compound within the composition. Each polymer compound, of the polymer component, can have a distinct molecular structure and possibly a different concentration.

As used herein, unless stated otherwise, experimental data was measured at standard ambient temperature and pressure (SATP). That is standard ambient temperature of about 25° C. and standard ambient pressure of about 1 bar.

The composition can come in two forms: a precursor variation (also referred to as precursor, precursor variant, precursor electrolyte, precursor composition, or uncured electrolyte) or an active variation (also referred to as the active variant, active composition, active electrolyte, cured polymer electrolyte, or cured electrolyte). As used herein, the terms "composition" or "electrolyte", may be used to refer to either the precursor variant or the active variant. The precursor variation is the inactive (e.g., prior to curing, not polymerized, etc.) variant of the electrolyte composition, which may include some and/or all of the components of the electrolyte composition. Dependent on implementation, the precursor may be converted to the activated composition by addition of compound(s) (e.g., an initiator compound) and/or implementation of an activation process (e.g., curing). The precursor functions as an inactive form of the electrolyte that may be more amenable for storage and transport. For example, the precursor may be used for sale and/or distribution in combination with an "activating" component, which may be used to convert the precursor composition to the active composition.

In some variations, the precursor may comprise a not fully polymerized (e.g., not polymerized, partially polymerized, incompletely polymerized, etc.) polymer component, wherein the addition of a polymerization initiator, under the appropriate thermodynamic conditions, may enable conversion of the precursor to the active composition. In other variations, the precursor may lack some component(s) (e.g., one salt component), which may be added (e.g., prior to curing). It should be noted that the precursor electrolyte may have some electrolyte functionality. That is, the precursor composition may function as an electrolyte, but with the conversion of the electrolyte precursor to the electrolyte (e.g., with introduction of a polymerization initiator, catalyst, curing mechanism, activation mechanism, etc.) the electrolyte may provide altered, or enhanced, performance capabilities as compared with the electrolyte precursor.

In some variations, the precursor composition, can provide improved battery implementation, prior to activation of the composition. That is, the precursor composition can function as an improved variation for dispersion in the battery. Examples of improved dispersion may include: faster dispersion through the battery, improved distribution of the electrolyte (e.g., homogeneous distribution throughout the battery), and/or improved wetting of battery components (e.g., improved separator wetting, improved electrode wetting, etc.).

In some of these variations, the precursor electrolyte can have different effective material properties as compared to the active electrolyte. As a general comparison between the precursor composition and the active composition, the precursor composition can have a lower viscosity and be in a liquid state, whereas the active composition can be largely non-flammable, have a low self-extinguishing time, behave like a solid (e.g., be a gel, be a solid, etc.). For example, the precursor composition can have a low viscosity (e.g. <40 cP at 25° C.). In another example, the precursor composition can comprise a liquid composition as compared to a freestanding (e.g., gel, solid) active composition. Depending on implementation, the precursor composition and/or active composition can have a low self-extinguishing time (SET<5 s/g) and have flame-retardant properties.

The composition may be converted, or be provided, as an active composition. The active composition may be the functional electrolyte. In some variations, the active composition can have one or more additional components that provide no direct functional capability to the electrolyte, but are implemented to enable conversion of the precursor composition to the active composition (e.g., a polymerization initiator additive, a polymerization inhibitor additive). However, the activation control additives (e.g., inhibitors, initiators) can provide direct functional impact on the battery operation. In many variations, the active composition may be freestanding. As used herein, the term freestanding may refer to a "relatively" solid state at the timescales of activity of the battery. That is, freestanding may refer to a solid state or a viscoelastic gel and/or other similar "solid-like" state.

While typically different, the active composition can have the same material state as the precursor composition. For example, in one implementation, both the precursor and the active electrolyte are liquids. In another variation, the precursor can be a liquid and the active electrolyte can be a gel, or gel-like. In another variation, the precursor can be a liquid and the active electrolyte can be a solid. The functional properties of the active electrolyte can vary dependent on the desired implementation.

In some variations, the active composition may have increased toughness (>50,000 J/m$^3$) and increased adhesion force (>0.4 N/cm) between the active composition and a battery component (e.g., electrode, separator, charge collector, etc.). The active composition may also have reduced self-extinguishing time (<5 s/g) when combustion is induced and/or occurs. In some variations, the storage temperature range (e.g., −80° C. to 85° C.) and operating temperature range (e.g., −20° C. to 60° C.) of the active composition can be expanded (e.g., relative to the precursor composition, relative to a liquid electrolyte solution, relative to a precursor solution excluding polymer precursors such as monomers or oligomers, etc.) and/or the active composition can be tuned for greater performance in specific ranges. The active composition can have elastic properties such that the resulting material has a higher storage modulus than loss modulus at room temperature. The elastic modulus for the active composition can be in the range of 0.1 MPa to 100 MPa. The active composition can also be ionically conductive (e.g., >0.1 mS/cm). In one example, the active composition has a conductivity approximately between 0.1 mS/cm and 100 mS/cm. However, the active composition can have any suitable ionic conductivity (e.g., >100 mS/cm).

In one example, for a battery implementation, or other appropriate incorporation, the composition may comprise a pre-cured electrolyte polymer that is then polymerized in-situ. That is, the pre-cured electrolyte composition may comprise an unpolymerized, or not fully polymerized pre-cured state, that after injection into the use system (e.g., a battery), may become sufficiently polymerized to function: as the battery electrolyte, as a complementary electrolyte to the battery electrolyte, and/or as battery electrolyte replacement. In another implementation, the electrolyte composition may comprise a fully active (e.g., tough and/or ionically conductive) polymer electrolyte. This electrolyte composition may be prepared and polymerized ex-situ and then incorporated into the battery. That is, the electrolyte polymer composition may be prepared to a fully functioning state (e.g., cured) prior to injection into the use system. In another variation, the electrolyte polymer composition can be prepared during cycling (e.g., charge and discharge cycles) of the battery, where the cure state can depend on characteristics of the cycles (e.g., depth of discharge, voltage(s) maintain during cycles, duration of time the battery is held at a given voltage, number of cycles, etc.).

The composition may include a polymer component, wherein the polymer component comprises at least one polymer compound and/or monomers and/or oligomers that may be polymerized to form the polymer compound. The polymer component may comprise 8%-80% (by weight, by mass, by volume, by stoichiometry, etc.) of the composition. Electrolytes that include the polymer compounds can demonstrate an elastic or partially elastic response to strain. Additionally or alternatively, they can demonstrate a storage modulus that is higher than the loss modulus at room temperature.

As used herein, the polymer compound (e.g., activated polymer, activated polymer precursor, active polymer electrolyte) preferably includes a compound with crosslinking capability including dynamic and covalent bonding (e.g., to provide a greater toughness, to provide enhanced ionic conductivity, etc.). As shown for example in FIGS. 10-14, each polymer component can include subcomponents that enable dynamic crosslinking (dynamic polymer subunit) and/or covalent crosslinking (covalent crosslinking subunit). In many variations, the active polymer electrolyte can have a toughness of greater than 50,000 J/m$^3$ as measured by tensile testing until break at 25° C. and/or using other suitable measurements. Examples of dynamic crosslinking subunits may include: urea, urethanes, hydrogen bonding groups (e.g., hydrogen bond donors, hydrogen bond acceptors), imine groups, boronic esters, ionic chelating domains, and/or through other functional groups. Subunits can be toughening by additional mechanisms including steric entanglement (e.g., generated by polycyclic compounds particularly, but not exclusively, bridged compounds such as isobornyl derivatives or spiro compounds). Examples of covalent crosslinking subunits (e.g., subunits in monomers or oligomeric that can result in covalent crosslinking in the activated polymer, functional groups) may include: acrylate, methacrylate, cyanoacrylate, epoxy, imide, and/or thiol (e.g., for thiol-ene reaction) functional groups.

As used herein, each polymer compound (e.g., polymer precursor) is a distinct molecule, which may, or may not, be built of distinct monomeric subunits as compared to a second polymer compound. The distinct molecules can be a monomer, oligomer (where oligomer as used herein can refer to a material that includes between 2 and 20 repeating monomeric subunits and/or a material where one or more physical property such as phase, melting point, glass transition temperature, viscosity, etc. of the material substantially changes after the addition of or removal of one monomeric unit), a polymer (e.g., the polymer electrolyte can be formed from polymers that undergo polymerization to form the crosslinked network including both covalent and dynamic bonding), a molecule or atom that can interact with other molecules (e.g., with the polymer electrolyte), and/or can be any suitable compound. That is, for a polymer precursor including (e.g., derived from) two compounds, a first polymer precursor and a second polymer precursor; the first polymer precursor may have distinct monomeric subcomponents as compared to the second polymer precursor. Additionally or alternatively, the two polymer precursors may have the same monomeric subunits with distinct functional group(s).

In one example, the polymer component (e.g., collection of all polymer precursors, collection of molecular species that become the polymer, etc.) comprises one oligomeric compound (and/or its monomer, dimer, trimer, etc. constituents). In another example, the polymer component comprises two oligomeric compounds (and/or their monomer, dimer, trimer, etc. constituents). In another example, the polymer component comprises three oligomeric compounds (and/or their monomer, dimer, trimer, etc. constituents). In a fourth example, the polymer component comprises four oligomeric compounds (and/or their monomer, dimer, trimer, etc. constituents). In another example, the polymer component comprises five oligomeric compounds (and/or their monomer, dimer, trimer, etc. constituents). In another example, the polymer component comprises six, or more, oligomeric compounds (and/or their monomer, dimer, trimer, etc. constituents).

As used herein, monomers and oligomers are generally used to refer to polymer subunits of a not (e.g., not "fully," not activated, incompletely polymerized, in an un-cured state, during curing, etc.) polymerized compound. That is, compounds referred to as monomers and oligomers are considered not sufficiently polymerized to be in a so-called [fully] polymeric state. This may also referred to herein as an un-cured state since curing may be involved in the polymerization process. As part of the electrolyte composition description, reference to the polymer component comprising primarily oligomers (or other subcomponents), would suggest that the electrolyte is in the precursor/un-cured/not-fully-polymerized state. As the polymer component may commonly include polymer subcomponents at all levels of polymerization, a cured, "fully" polymerized, polymer component refers to the polymer component that has been sufficiently polymerized to demonstrate desired functional properties of the polymer component. These functional properties that may be used to define/identify the active polymer component may include: composition state (e.g., liquid to freestanding transition), toughness (>50,000 J/m$^3$ at 25° C.), ionic conductivity (>0.1 mS/cm at 25° C.), adhesion properties such that the adhesion force for the electrolyte and electrode is greater than 0.4 N/cm, wettability, etc. Additionally, or alternatively, the polymerized state may be described with a molecular description (e.g., a concentration of polymers with length greater than N). Dependent on the specific implementation, the specific concentrations may vary. Additionally, or alternatively, the polymerized state may be described by the degree of crosslinking between polymer components such that in the precursor state there is no covalent crosslinking (e.g., only dynamic crosslinking, no crosslinking, crosslinking density less than about 1 mol/m$^3$, etc.) while in the polymerized state there is crosslinking (e.g., sufficient crosslinking to result in a self-standing film, crosslinking density greater than about 10 mol/m$^3$, covalent crosslinking, etc.). In many variations, the polymer component has been considered to transition to the polymerized state once the elastic modulus of the composition is greater than 0.1 MPa (e.g., between 0.1 and 100 MPa or any value or range of values contained therebetween). In one example, the elastic modulus of the polymerized state may be between 0.1 MPa and 1 MPa. In another example, the elastic modulus is between 0.5 MPa and 2 MPa. In an additional example, the elastic modulus is between 50 and 100 MPa.

Analogous to the polymer component, dependent on the electrolyte composition state and implementation, each compound that is a component of the polymer component, may have a polymerized and unpolymerized state (e.g., the compounds that make up the polymer component of the electrolyte can be a monomer, oligomer, polymer, etc.). The polymerized/cured state would be when the polymer component is sufficiently polymerized such that either the electrolyte composition, or the specific polymer compound displays a desired functional or molecular property. For example, when the polymer component is sufficiently "tough", and/or the composition is sufficiently ionically conductive.

Analogous to the polymer component, the electrolyte composition may have at least one active and/or inactive state(s). In many variations, these active/inactive states may be due directly to the state of the polymer component. That is, dependent on variation and stage of implementation, each polymer compound may be distinctly fully polymerized (e.g., as a fully functional electrolyte); fully unpolymerized (e.g., as monomeric components), or partially polymerized (e.g., as dimers, trimers, etc.). The stage of polymerization may be dependent on the desired use case (e.g., primary electrolyte or supplementary electrolyte) and/or the stage of battery development (e.g., electrolyte storage, battery preparation, battery operation). Alternatively, other factors may play a role in the state of the composition. The active/cured state of the electrolyte composition may be set by either a functional or molecular property of the composition, such as: composition state (e.g., liquid, solid), ionic conductivity, wettability, adhesion property, level of polymerization of the polymer components, and/or other suitable property(s). The inactive state would then be when the composition is not sufficiently ionically conductive and/or the polymer component is not sufficiently polymerized. For example, the active polymer component and/or electrolyte composition state may be set by the level of crosslinking. In one implementation, the active polymer state is, and thereby the active electrolyte composition state, set by the level of covalent crosslinking within the electrolyte composition.

Typically, once the polymer component and/or electrolyte composition is in the active state, it cannot be reversed to the inactive state. However, some implementations could enable reversible switching between the active and inactive state. Other implementations can result in degradation of the active polymer into a degraded state (e.g., where the polymer and/or electrolyte no longer attain the target properties) such as via successive depolymerization (into polymeric precursors such as for subsequent polymerization), random chemical degradation (e.g., along a polymer backbone, along a backbone of the polymer precursors such as along backbones of oligomers used to form the polymer, etc.), and/or by other means.

Functional properties that describe the inactive and the active state of the electrolyte composition may further include: the toughness and/or adhesion provided by the polymer component, the viscosity and/or wettability of the polymer component (and/or polymer precursor, inactive electrolyte composition, etc.), a transition temperature (e.g., melting temperature, glass transition temperature, etc.) of the polymer component, an ionic conductivity of the electrolyte (e.g., activated electrolyte, inactive electrolyte, etc.). Molecular properties that describe the inactive and active states include: the degree of crosslinking between polymer subunits, a molecular weight of the polymer components. For example: in some variations the active state may have a toughness of greater than 50,000 J/m$^3$ at room temperature; in some variations the inactive state may comprise a liquid that has a viscosity less than 40 cP at 25° C., whereas the active state comprises a freestanding film (e.g., the inactive state may be used to wet battery components prior to being set as a film); and in some variations, the active state may not have a melting point.

In some variations, the composition may include multiple active and/or inactive states. Alternatively, the composition may have a "continuous" transition between inactive and active states. For example, the composition may continuously improve as an electrolyte as it becomes further polymerized. In this example, the composition may be considered active when it is sufficiently polymerized (or activated in another way) to reach some threshold of electrolyte activity. Dependent on implementation, the threshold may be any varying property of the composition. Examples include: ionic conductivity, adhesion properties, extensibility, Young's modulus (or other stress/strain property), wettability, etc.

As mentioned above, the polymer component may be: in a polymerized state, wherein each polymer compound may be fully (or nearly fully) polymerized; or in a pre-cured state wherein each polymer compound has not been polymerized and comprises "shorter" oligomer pieces (i.e., oligomer compounds or oligomer subcomponents). Each polymer compound may be composed of subcomponents, e.g., possible monomeric subcomponents, and/or shorter N-mer, subcomponents, and/or crosslinkers in a pre-cured state.

Polymer compounds may include crosslinking functional groups as individual monomer units or as subunits of an oligomer. Dependent on implementation, crosslinkers may comprise any general type of crosslinking. Examples of covalent crosslinkers that may be included are: acrylate domains, methacrylate domains, epoxy domains, thiol domains, and/or imide domains. However, other domains can be used for the covalent crosslinking. Examples of dynamic crosslinking domains include hydrogen bond crosslinkers (e.g., amides, carbamate, urea, carboxyl, hydroxyl, hydroperoxyl, hemiacetal, hemiketal, carboxamide, amidine, primary amine, secondary amine, tertiary amine, primary ketamine, primary aldimine, imide, azide, diimide, cyanate, isocyanate, nitrate, nitrile, nitrosooxy, nitro, nitroso, oxime, etc.), ionic chelating domains (e.g., amines, anionic pendant groups, cationic pendant groups, chelating groups, zwitterion pendant groups, etc.), ion-pair bonding interactions, and/or steric interactions. However, other crosslinkers can be used. In many variations, each polymer compound can have toughening domains (where the toughening domains are typically a result of or result in the dynamic crosslinking). The toughness of the polymer component can be further tuned by employing different additive cross-linkers in the pre-cured state and by changing the density of the cross-linking. In this case, additional cross-linking agents may be used including but not limited to N-N' methylenebisacrylamide, pentaerythritol tetraacrylate, diethyleneglycol dimethacryltate, (2,2-bis(((4-azido 2,3,5,6-tetrafluorobenzoyl)oxy)methyl)propane-1,3-diyl bis (4-azido-2,3,5,6-tetrafluorobenzoate), or cross-linking via acid-amine condensation.

In many variations, polymers (and/or precursors thereof) may include toughening domains (or toughening components) that can include dynamic bonding (e.g. H-bonds, dynamic covalent bonds, ion pairing, steric entanglements, metal-chelating, π-π interactions, π-cation interactions, π-anion interactions, and/or host-guest interactions such as interactions with an interaction strength between about 0.5 and 50 kJ/mol) and/or polar moieties (e.g., urethane, carbamate, carbamide, O-thiocarbamate, S-thiocarbamate, dithiocarbamate, carboximidate, amidines, carbonate, carboxylate, carboxamide, imide, oxime, thioester, dithicarboxylic acid, etc. optionally including steric interference effects; polycyclic rings; intermolecular interactions mediated by dipoles quadrupoles, multipoles, induced multipoles, etc.; etc.). In the pre-cured state, the electrolyte composition may include dynamically bonding resins and/or monomers, including but not limited to: dynamically bonding methacrylates (e.g. (2-(3-(6-methyl-4-oxo-1,4-dihydropyrimidin-2-yl)ureido)ethyl methacrylate), guest-host interactions (e.g. alpha-cyclodextrin with polyethylene glycol), metal-ligand interactions (e.g. 2-2'-bipyridine-5-5'-dicarboxylic amide with Zn, Mg, or Fe based ions), ion-pairing interactions (e.g. acrylic acid with 2-(diisopropylamino)ethyl methacrylate), and/or dynamic covalent bonds. Other examples of dynamically bonding resins and monomers include: polyester urethane acrylates, polyester urethane methacrylates, polyether urethane acrylates, polycarbonate urethane acrylates, polycarbonate-polyether urethane acrylates, polycarbonate-polyester urethane acrylates, polyether-polyester urethane acrylates, polyimide urethane acrylates, polyester acrylates, epoxy acrylates, polycarbonate acrylates, polyester-polycarbonate acrylates, polyether acrylates, polyether-polyester acrylates, polyether-polycarbonate acrylates, polyether-polyester-polycarbonate (or other orderings thereof such as polyether-polycarbonate-polyester, polyester-polyether-polycarbonate, etc.) acrylates, aminated acrylates (e.g., aminated polyether acrylates, aminated urethane acrylates, aminated polyester urethane acrylates, aminated polycarbonate acrylates, combinations thereof, etc.), polycarbonate urethane methacrylates, polycarbonate-polyether urethane methacrylates, polycarbonate-polyester urethane methacrylates, polyether-polyester urethane methacrylates, polyimide urethane methacrylates, polyester methacrylates, epoxy methacrylates, polycarbonate methacrylates, polyester-polycarbonate methacrylates, polyether methacrylates, polyether-polyester methacrylates, polyether-polycarbonate methacrylates, polyether-polyester-polycarbonate (or other orderings thereof such as polyether-polycarbonate-polyester, polyester-polyether-polycarbonate, etc.) methacrylates, aminated methacrylates (e.g., aminated polyether methacrylates, aminated urethane methacrylates, aminated polyester methacrylates, aminated polycarbonate methacrylates, combinations thereof, etc.), polybutadiene urethane acrylates, polybutadiene urethane methacrylates, bisphenol A epoxy diacrylate, silicone urethane acrylate, thioether dendritic acrylates, thioether dendritic methacrylates, functional aliphatic polyether urethane acrylate, difunctional (e.g., diacrylate, diurethane, diurethane diacrylate) aromatic urethane acrylate, hydrophobic urethane acrylates (e.g., difunctional aliphatic hydrophobic urethane acrylate, aliphatic hydrophobic urethane acrylates, etc.), hydrophobic urethane acrylates (e.g., difunctional aliphatic hydrophobic urethane methacrylate, aliphatic hydrophobic urethane methacrylates, etc.), isobornyl acrylate (IBOA), poly(ethylene glycol) methacrylate, poly(ethylene glycol) methyl ether methacrylate, poly (ethylene glycol) diacrylate, trimethylolpropane triacrylate (TMPTA), tripropylene glycol diacrylate (TPGDA), 1,6-hexanediol diacrylate (HDDA), (hydroxyethyl)methacrylate (HEMA), urethane epoxy monomers and/or oligomers (e.g., monofunctionalized with an epoxy head group, difunctionalized with epoxy head groups, etc.), urea epoxy monomers and/or oligomers (e.g., monofunctionalized with an epoxy head group, difunctionalized with epoxy head groups, etc.), urethane imide monomers and/or oligomers (e.g., monofunctionalized with an imide head group, difunctionalized with imide head groups, etc.), urea imide monomers and/or oligomers (e.g., monofunctionalized with an imide head group, difunctionalized with imide head groups, etc.), thiol urethane monomers and/or oligomers (e.g., monofunctionalized with a thiol head group, difunctionalized with thiol head groups, etc.), thiol urea monomers and/or oligomers ((e.g., monofunctionalized with a thiol head group, difunctionalized with thiol head groups, etc.), polycarbonate epoxy oligomers, polyester epoxy oligomers, polyether epoxy oligomers, polycarbonate-polyester epoxy oligomers, polycarbonate-polyether epoxy oligomers, polyester-polyether epoxy oligomers, polycarbonate-polyether-polyester (or other similar variations of ordering) epoxy oligomers, polycarbonate imide oligomers, polyester imide oligomers, polyether imide oligomers, polycarbonate-polyester imide oligomers, polycarbonate-polyether imide oligomers, polyester-polyether imide oligomers, polycarbonate-polyether-polyester (or other similar variations of ordering) imide oligomers, polycarbonate thiol oligomers, polyester thiol oligomers, polyether thiol oligomers, polycarbonate-polyester thiol oligomers, polycarbonate-polyether thiol oligomers, polyester-polyether thiol oligomers, polycarbonate-polyether-polyester (or other similar variations of ordering) thiol oligomers, and many more possible additional carbonates, esters, ethers, nitriles and/or other species. Examples of the above that include more than one polymeric or oligomeric subgroup (polyester-polycarbonate as an illustrative example but true for any of the above similarly reference materials) can form block co-oligomers (also referred to as co-polymers), alternating co-oligomers, random co-oligomers, graft co-oligomers, and/or combinations thereof.

In addition to the toughening domains(s), the polymer compounds may also contain ionically conductive domains (e.g., polar moieties such as polar moieties described above). Alternatively, the electrolyte composition may include an ionically conductive component. The ionically conductive component and/or ionically conductive domains may function to improve the ionic conductivity of the electrolyte composition. In some variations, the ionically conductive component may include ionically conducting polyethylene glycol, poly(ethylene glycol) methyl ether methacrylate, carbonates, esters, ethers, nitriles, and/or other suitable functional groups (e.g., polar functional groups as described above). In one example, the toughening component and ionically conductive component are a part of the same resin. In another example, the toughening component and ionically conductive components are distinct. In many variations, the ionic conductivity (e.g., lithium ion conductivity, mobile ion for the energy storage system, etc.) of the polymer electrolyte in its active state is greater than 0.1 mS/cm at 25° C.

The composition may include a salt component. The salt component can include at least one salt compound. The electrolyte composition preferably includes 8%-40% (by mass, by volume, by stoichiometry, etc. based on the total electrolyte composition, relative to the polymer, etc.) of the salt compound(s). The salt concentration is typically between about 1 M and 10 M (e.g., 1.5 M, 2 M, 3 M, 4 M, 5M, 6 M, 7.5 M, 8M, 9 M, values or ranges therebetween, etc.). For example, the salt concentration can be approximately 1 M to 2 M. In another example, the salt concentration can be 2 M to 3 M. The salt component functions to provide ions for the electrolyte. Additionally, or alternatively, the salt component can affect the solid electrolyte interphase (SEI layer), battery conductivity, electrode passivation, operation/stability temperature range, battery cyclability, polymer plasticity, and/or other suitable properties. The choice of salt component can depend on the polymer electrolyte use case. As used herein, without any loss of generality, the salt component will be described for a lithium battery use case. For example, for a lithium battery, the salt component may include lithium salts. More specifically, examples of lithium salt compounds include but are not limited to: lithium hexafluorophosphate (LiPF$_6$), lithium hexafluoroarsenate (LiAsF$_6$), lithium tetrafluoroborate (LiBF$_4$), lithium perchlorate (LiClO$_4$), lithium tetracyanoborate (LiB(CN)$_4$) lithium bis(fluorosulfonyl)imide (LiFSI), lithium bis(trifluorosulfonyl)imide (LiTFSI), lithium tris(trifluoromethanesulfonyl)methide (LiTFSM), lithium bis(oxalate)borate (LiBOB), lithium difluoro(oxalato)borate LiDFOB, lithium fluoroalkylphoshpates (LFAP such as lithium tris(pentafluoroethyl)trifluorophosphate), lithium-cyclo-difluoromethane-1,1-bis(sulfonyl)imide (LiDMSI), lithium-cyclo-hexafluoropropane-1,1-bis(sulfonyl)imide (LiHPSI), lithium-cyclo-hexafluoropropane-1,1-bis(sulfonyl)imide (LiBETI), lithium difluoro(oxalato)borate (LiDFOB), lithium bis(monofluoromalonato)borate (LiBFMB), lithium 4,5-dicyano-1,2,3-triazolate (LiDCTA), lithium 2-trifluoromethyl-4,5-dicyanoimidazole (LiTDI), lithium 4,5-dicyano-2-(pentafluorylethyl) imidazole (LiPDI), and/or other suitable lithium salt(s).

In one variation, the salt component includes one salt. In a second variation, the salt component includes two salts. In a third variation, the salt component includes three salts. In a fourth variation, the salt component includes four salts. In another variation, the salt component includes five or more salts. In some variations, the salt component may be modified during use. The number of salts may generally depend on the desired electrolyte properties and may be implementation specific. In one example for a lithium battery implementation, the salt component can include at least $LiPF_6$ and LiDFOB. In another example of a lithium battery implementation, the salt component can include at least LiTFSI and LiBOB. In one low temperature implementation, the salt component can include at least $LiBF_4$. For example, a pre-cured electrolyte composition can include a salt component with a set of salts that improve battery wetting. For battery function, additional salts may be added to improve the ionic conduction of the electrolyte or to improve the electrode/electrolyte interface stability or reduce the cell impedances. In one high energy density anode battery implementation, the salt component can include at least LiTFSI and LiFSI.

The composition may include an additive component. The additive component can include any number of additive compounds, and functions to provide certain properties for the electrolyte composition, and/or for battery functionality implementation. The additive component can include approximately 1%-80%, by weight, of the composition. The additive concentrations can be significantly different dependent on the specific compound. For example, flame retardant additive components may vary from approximately 0%-20% of the composition; plasticizers additive components may vary from approximately 10%-80% of the composition; and other additive components may generally vary from approximately 1%-10% of the composition. The additive component may help improve battery stability (e.g., reduced flammability), improve interfacial stability between electrode and electrolyte (e.g., facilitate SEI formation), improve battery cycling, help set or modify temperature operating ranges of the battery, improve electrolyte implementation (e.g., electrolyte curing), reduce electrolyte degradation, reduce battery component degradation (e.g., reduced electrode degradation), and/or provide other properties or functionalities to the battery and/or provide properties for the electrolyte formation or battery operation. In some variations, an additive component can include a secondary salt compound (e.g., an additional salt from the salt compounds above). In some variations, the electrolyte polymer composition may not include an additive. The type, number, and/or concentration of additive compounds can depend on desired function (e.g., high temperature functionality, extreme stability, battery cyclability) and/or battery implementation (e.g., battery type, battery separator properties, battery application, etc.). Examples of possible "functional" additive compounds include: 1,3,2-dioxathiolane-2,2-dioxide (DTD), vinyl acetate (VA), 2-vinyl pyridine (VP), fluoroethylene carbonate (FEC), trivinylcyclotriboroxane (tVCBO), VC, LiDFOB, LiBOB, sulfone, ethyl methyl sulfone, tetramethyl sulfone (TMS), prop-1-ene-1,3-sulfone (PES), 1,3-propane sultone (PS), cyclic sulfate, dioxolone, 5-methyl-4-((trifluoromethoxy)methyl)-1,3-dioxol-2-one, phenyl boronic acid glycol ester (PBE), 5-methyl-4-((trimethylsilyloxy)methyl)-1,3-dioxol-2-one, trimethylphosphate (TMP), triethylphosphate (TEP), tributylphosphate (TBP), triphenylphosphate (TPP), tris(2,2,2-trifluoroethyl)phosphate (TFP), methyl P,P-bis(2,2,2-trifluoroethyl)phosphate (BMP), trimethylphosphite (TMPi), tris(2,2,2-trifluoroethyl)phosphite (TTFPi), dimethyl methyl phosphate (DMMP), diethyl ethylphosphate (DEEP), bis(2,2,2-trifluoroethyl) methylphosphate (TFMP), bis(2,2,2-trifluoroethyl) ethylphosphate (TFEP), hexa(methoxy)cyclotriphosphazene (HMOCPN), (ethoxy)pentafluorocyclotriphosphazene (PFPN), (phenoxy)pentafluorocyclotriphosphazene (FPPN), and/or other suitable additives.

In some variations the additive component can include at least one of FEC, VC, EC and DEC. In some other variations, the additive component can include at least one of FEC, VC, EC and DMC. In another variation, the additive component can additionally or alternatively include at least one of a flame retardant additive (e.g., a phosphate, phosphite, phosphonate, phosphonite, phosphide, etc. such as TMP, TEP, TBP, TPP, TFP, BMP, TMPi, TTFPi, DMMP, DEEP, TFMP, TFEP, DMMP, DEEP, TFMP, TFEP, HMOCPN, PFPN, FPPN, etc.).

In some variations, the electrolyte can include a plasticizer. The plasticizer comprises at least one plasticizer compound, and functions to improve the flexibility of the electrolyte. Additionally or alternatively, the plasticizer may reduce the viscosity of pre-cured electrolyte composition and/or can otherwise function. Any typical plasticizer compound may be included as part of the plasticizer. Examples of plasticizer compounds include: ethylene carbonate (EC), diethyl carbonate (DEC), dimethyl carbonate (DMC), ethyl methyl carbonate (EMC), propylene carbonate (PC), vinylene carbonate (VC), dimethoxyethane (DME), diethyl ether, tetrahydrofuran (THF), methyl formate (MF), ethyl formate (EF), methyl propionate (MP), methyl butanoate, ethyl formate (EF), ethyl acetate (EA), ethyl propionate (EP), propyl formate, propyl acetate (PA), propyl proprionate (PP), glyme, diglyme, triglyme, tetraglyme, and/or other suitable plasticizers (e.g., electrolyte solvents, liquid electrolyte solvents). In one implementation, a combination of DEC and EC (e.g., 1:1, 1:2, 2:1, 3:7, 7:3, etc. v/v, w/w, w/v, v/w, etc.) are included as the plasticizer component. In one variation, the plasticizer may comprise a majority weight percentage of the electrolyte composition (e.g., >50% by weight). Alternatively, the plasticizer may be less than a majority weight percentage. In one variation, the plasticizer may comprise approximately 40%-50% of the electrolyte composition. In another variation, the plasticizer may comprise approximately 30%-40% of the electrolyte composition. In a third variation, the plasticizer may comprise approximately 20%-30% of the electrolyte solution. In a fourth variation, the plasticizer may comprise less than 20% of the electrolyte solution. In one example of the fourth variation, the plasticizer may comprise approximately 10%-20% of the electrolyte solution. In another example of the fourth variation, the plasticizer may comprise approximately 0.01%-10% of the electrolyte solution. Any desired method may be implemented for choosing the plasticizer. For instance, the plasticizer can be chosen such that the salt is sufficiently soluble and has high conductivity.

In some variations (e.g., for pre-cured electrolyte), the electrolyte component can include an initiator (e.g., polymerization initiator). The initiator can function to initiate polymerization of the polymer component, thereby enabling polymerization of the polymer compounds, i.e., polymerizing monomer and/or oligomer subunits (e.g., polymer precursors) of the polymer compounds. That is, the initiator can be added to the inactive electrolyte to activate, or help activate, the electrolyte. Thus, the initiator can be added to the composition at some time before and/or when electrolyte activation is desired. Alternatively, the initiator can be part of the initial composition and placing the composition in the appropriate thermodynamic conditions can activate the initiator. Degradation products resulting from decomposition (e.g., thermal decomposition) of the initiator to generate radicals are preferably substantially inert to electrochemical reaction (e.g., within voltage window of the battery, in the electrolyte, etc.). For example, nitrogen can be formed during the radical formation using the initiator (where the nitrogen can be evacuated from the cell).

The initiator is preferably a thermal initiator (e.g., an initiator heated to a threshold temperature to activate the initiator). However, the initiator can additionally or alternatively be active mechanically (e.g., upon a threshold force application), electromagnetically activated (e.g., by illumination with electromagnetic radiation with sufficient wavelength, frequency, intensity, etc. such as gamma radiation, x-rays, ultraviolet radiation, visible radiation, etc.), electrochemically activated (e.g., activated at a threshold electrical potential), and/or can otherwise be activated. Examples of initiators include 1-1'-azobis(cyclohexanecarbonitrile), 2,2'-azobisisobutyronitrile (AIBN), 2,2-Bis(tert-butylperoxy)butane, 1,1-bis(tert-butylperoxy)cyclohexane, 2,2'-azobis[2-(2-imidazolin-2-yl)-propane] dihydrochloride, 2,5-bis(tert-butylperoxy)-2,5-dimethylhexane, 2,5-bis(tert-butylperoxy)-2,5-dimethyl-3-hexyne, bis(1-(tertbutylperoxy)-1-methylethyl)benzene, 1,1-bis(tert-butylperoxy)-3,3,5-trimethylcyclohexane, tert-butyl peracetate, tert-butyl hydroperoxide (TBHP), cumene hydroperoxide, di-tert-butyl peroxide, tert-butyl peroxybenzoate, tert-butylperoxyisopropyl carbonate, dicumyl peroxide, benzoyl peroxide, lauroyl peroxide, 2,4-pentanedione peroxide, peracetic acid, tert-amyl peroxybenzoate, 4,4-azobis(4-cyanovaleric acid), 1,1'-azobis(cyclohexanecarbonitrile) (ABCN or ACHN), ammonium persulfate, potassium persulfate (or other persulfate salts), lauroyl peroxide, tert-butyl peroxide, tert-butyl peroxybenzoate, benzoyl peroxide (BPO), phenylbis(2,4,6-trimethylbenzoyl)phosphine oxide), 2,2-dimethoxy-2-phenylacetophenone (DMPA), and/or any suitable initiator can be used. The concentration of initiator is typically between about 0.1% about 10% (e.g., wt % such as 0.1%, 0.2%, 0.3%, 0.5%, 1%, 2%, 2.5%, 3%, 5%, 7%, 7.5%, 9%, 10%, values or ranges therebetween, etc.) relative to a polymer precursor.

In some variations (e.g., for pre-cured electrolyte), the electrolyte can include an inhibitor (or polymerization inhibitor). The inhibitor can function to prevent, or slow down, early polymerization of the tough polymer component or other components, thereby delaying the initiation or polymerization of the tough polymer electrolyte until the desired time. The inhibitor may be part of the initial composition or be added in a later step. Examples of polymerization inhibitors include: phenothiazine (PTZ), butylated hydroxytoluene (BHT), hydroquinones (HQ), 4-methoxyphenol (MEHQ), monobenzone, hydroquinone, guaiacol, 2-hydroxy-5-methoxybenzaldehyde, 1,2-benzoquinone, 1,4-benzoquinone, 1,4-naphthoquinone, 9,10-anthraquinone, chloranil, quinone methide, p-phenylenediamines, diethylhydroxylamine, hydroxylhydroxylamine, (2,2,6,6-Tetramethylpiperidin-1-yl)oxyl (TEMPO), 4-hydroxy-TEMPO (TEMPOL), and/or any suitable inhibitor(s) can be used.

As described above, the composition can be provided in different states, wherein the general concentration (or relative concentrations) of components is effectively the same. These states may reflect the electrolyte in an inactive (un-cured) or active (cured) state. As shown in example the formulations A-D, FIGS. 10-13, these states can relate to the relative level of polymerization of the polymer compounds that form the polymer component. As shown in Formulation A (FIG. 10), the composition can occur (or be constructed) in a state wherein the polymer compound (e.g., oligomer) includes an ionically conducting component and/or a toughening component, where covalent crosslinkers are shown as "X." In many variations, the same compound can also occur (or be constructed) as shown in Formulation B (FIG. 11), wherein the ionically conducting component and/or the toughening component occur as part of the polymer precursor and as distinct components. This may occur in a partially polymerized state of the electrolyte composition, or when polymer precursor subunits are added to modify the properties of the electrolyte composition. The composition can also occur (or be constructed) as shown in Formulation C (FIG. 12), where all components are in distinct monomeric states (although it should be noted that the example in Formulation C shows a distinct type of crosslinker as compared to Formulation A, but can use the same type of crosslinker as in Formulation A). In many variations, Formulation C can be a form of the unpolymerized (e.g., inactive state) of the electrolyte. In the same manner as shown in Formulation A-C, Formulation D (FIG. 13) shows an example of the composition with monomer subunits for multiple (e.g., two) tough polymer compounds. In this example, each polymer compound can incorporate the same ionically conductive component, with distinct toughening components for each polymer precursor. In an alternative variation, as shown in Formulation E (FIG. 14), the composition could comprise a single polymer compound (polymer 1), wherein once polymerized, the polymer could incorporate two distinct toughening components (e.g., component 1 and component 2) and the ionically conductive component.

As mentioned above, the electrolyte composition may vary significantly depending on the implemented use case (e.g., battery type), work conditions (e.g., working temperature, battery size, cyclability, etc.). Additionally, dependent on how the initialization of the electrolyte composition is implemented (i.e., in-situ or ex-situ), the composition may further include components to enable polymerization and "activation" of the polymer compounds within a battery volume. Herein, sample battery formulations using the above specifications are provided. However, a person of ordinary skill in the art will recognize the formulations are not limited to these specific examples (e.g., other ratios can be used; polymer precursors, salts, plasticizers, initiators, inhibitors, additives, and/or other species can be substituted with other materials from the related lists; etc.)

In a first example lithium battery implementation, the composition may comprise: a tough polymer component, that includes covalent cross linkers, comprising: urethane acrylate(s) and/or urethane methacrylate(s), present in the range 5-50%, by weight, and isobornyl acrylate (IBOA) present in the range 1-15%, by weight; a salt component, comprising: LiPF6, present in the range 5-20%, by weight, and LiDFOB, present in the range 0.1-8%, by weight; an additive component, comprising: TMP, present in the range 0.5-20%, by weight, FEC, present in the range 0.1-5%, by weight, VC, present in the range 0.1-5%, by weight, and a plasticizer, comprising DEC, present in the range 10-40%, by weight, and EC, present in the range 10-40%, by weight. In one implementation of this example composition, the composition may further include an initiator, benzoyl peroxide, present in the rage, 0.01-3% by weight and an inhibitor, MEHQ, present in the range of 0.005-0.1% by weight. In this implementation, initiator and inhibitor may be part of the inactive state, wherein the inhibitor may prevent spontaneous polymerization, and the initiator may enable thermal initiation of the polymerization of the electrolyte to form its active state. This example composition may be particularly useful for flexible battery implementations, but may be generally used for any battery implementation.

In a second example lithium battery implementation, the composition may comprise: a tough polymer component that includes covalent cross linkers, comprising: polyacrylamide, present in the range 10-50%, by weight, polyethylene glycol dimethacrylate (PEGDMA), present in the range 5-20% by weight, and isobornyl acrylate (IBOA), present in the range 5-20%, by weight; a crosslinking agent, N,N'-methylenebisacrylamide, present in the range of 1-10% by weight; a salt component, comprising: LiTFSI, present in the range 1-20%, by weight, LiPO2F2 present in the range 0.1-3% by weight, and LiBOB present in the range 0.1-5%, by weight; and an additive component, comprising: TMP, present in the range 0.1-15%, by weight, FEC, present in the range 0.1-10%, by weight, VC, present in the range 0.1-10%, by weight, a plasticizer, comprising: DMC, present in the range 10-40%, by weight, and EC, present in the range 10-40%, by weight. In one implementation of this example composition, the composition may further include an initiator, benzoyl peroxide, present in the range, 0.1-5% by weight, and an inhibitor, MEHQ, present in the range of 0.005-0.1% by weight. In this implementation, the initiator and the inhibitor may be part of the inactive state, wherein the inhibitor prevents spontaneous polymerization, and the initiator enables thermal initiation of the polymerization of the electrolyte to form its active state. This example composition may be particularly useful for low temperature polymer batteries, but may be generally used for any battery implementation.

In a third example lithium battery implementation, the composition may comprise: a tough polymer component that includes dynamic and covalent cross linking, comprising: multifunctional polyether urethane methacrylate, present in the range 2-40%, by weight, and butyl acrylate, present in the range 2-20% by weight; a crosslinking agent, pentaerythritol tetraacrylate (PETA), present in the range of 1-10% by weight; a salt component, comprising: LiPF6, present in the range 3-10%, by weight, and LiTFSI present in the range 3-10%, by weight, and LiFSI present in the range 3-10% by weight; and an additive component, comprising: ethoxy(pentafluoro) cyclotriphosphazene (PFPN), present in the range 0.1-15%, by weight, FEC, present in the range 0.1-10%, by weight, VC, present in the range 0.1-10%, by weight, and a plasticizer component, comprising: EMC, present in the range 10-40%, by weight. In one implementation of this example electrolyte composition, the composition may further include an initiator, azobisisobutyronitrile (AIBN), present in the rage, 0.1-5% by weight, and an inhibitor, MEHQ, present in the range of 0.005-0.1% by weight. In this implementation, the initiator and the inhibitor may be part of the inactive state, wherein the inhibitor may prevent spontaneous polymerization, and the initiator may enable thermal initiation of the polymerization of the electrolyte to form its active state. This example composition may be particularly useful for high energy density batteries, but may be generally used for any battery implementation. This example composition may be also be particularly useful in conjunction with silicon anodes.

In a fourth example lithium battery implementation, the composition may comprise the same composition as the third example and is injected into a cell containing a high-volume change anode containing 1-99% Si. In the same manner, as part of an inactive state implementation, this example may further include an initiator, azobisisobutyronitrile (AIBN), present in the rage, 0.1-5% by weight, and an inhibitor, MEHQ, present in the range of 0.005-0.1% by weight. This electrolyte composition may be injected into the cell in the inactive state. Once the cell components have been sufficiently "wetted", the initiator may be thermally degraded to initiate the polymerization of the components and to convert the electrolyte composition to the active state.

4. Battery System

Figure 1:
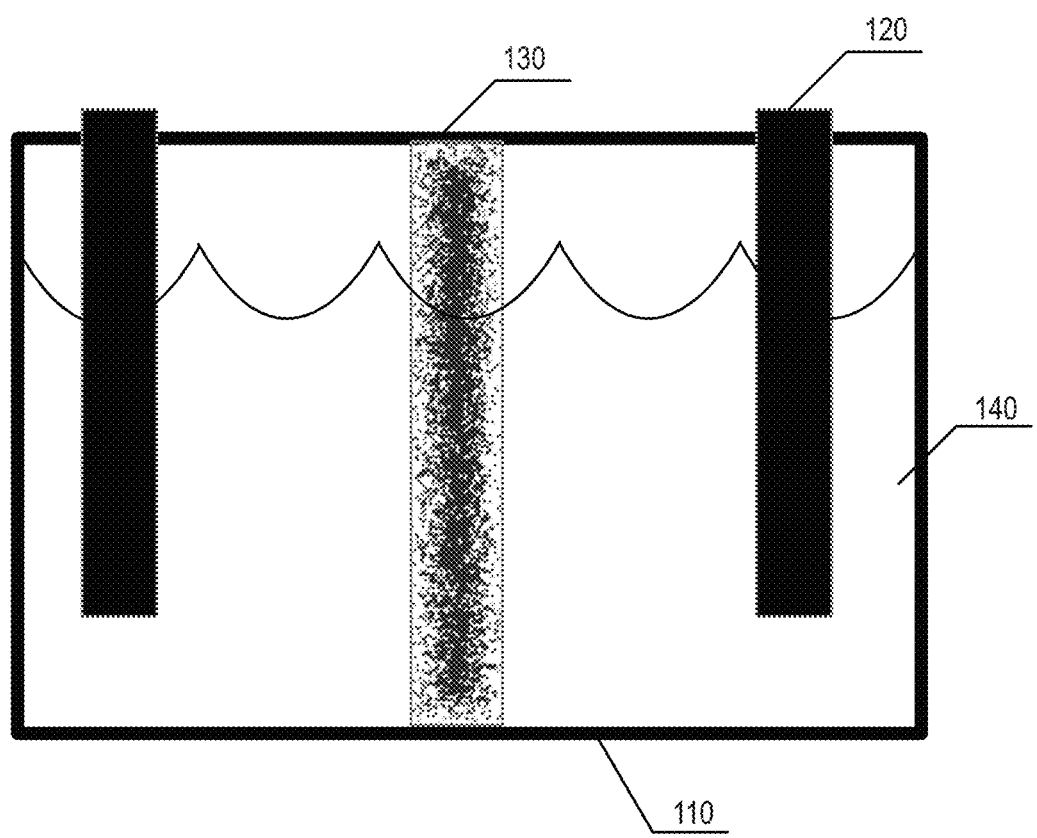
FIG. 1 is an example schematic of a battery system that includes tough polymer electrolyte.

In some variations, the polymer electrolyte composition may be a component in battery implementations. However, the polymer electrolyte can additionally or alternatively be used for supercapacitors, capacitors, fuel cells, and/or other energy storage applications or other systems. As shown for example in in FIG. 1, a polymer electrolyte battery can include: a case 110 (e.g., an enclosure for battery components); a set of electrodes 120 (e.g., a cathode and an anode situated distally from each other within the case); a separator 130 (e.g., situated between the cathode and the anode); and an electrolyte 140 distributed throughout the case, wherein the electrolyte includes a polymer electrolyte composition comprising a polymer component that includes crosslinker, a salt component, an additive component, a plasticizer component, and/or other suitable component(s). The battery system may function as a "battery:", wherein the polymer electrolyte composition provides enhanced implementation of specific properties (e.g., battery stability, high energy density, improved ionic conductivity, reduced flammability, battery flexibility, mechanical properties, etc.).

The battery system can include an implementation of wide variety of batteries with different geometries. These geometries might include wound pouch cells, stacked pouch cells, z-folded pouch cells, cylindrical cells, prismatic cells, or cells of unusual form factors.

In one example battery system, the battery system can include: a case 110, a pair of electrodes 120 (cathode and anode), a separator 130, and the electrolyte composition. Dependent on the implementation, the cathode can include a cathode active material (e.g., lithium cobalt oxide (LCO), lithium nickel manganese cobalt oxide (NMC), lithium nickel manganese oxide (LNMO), lithium iron phosphate (LFP), lithium manganese oxide (LMO), lithium nickel cobalt aluminium oxide (NCA), etc. such as NCM811, NCM 333, NCM523, NCM 622, NCM111, etc.), a conductive additive (e.g., carbon black such as C45, C65, etc.; carbon super P; acetylene black; mesocarbon microbeads (MCMB); graphene; carbon nanotubes (CNTs) such as single walled carbon nanotubes, multiwalled carbon nanotubes, semi-conducting carbon nanotubes, metallic carbon nanotubes, etc.; reduced graphene oxide; electrochemical graphene oxide; graphite; fullerenes; conductive polymers; combinations thereof; etc.), binders (e.g., carboxymethyl cellulose (CMC), styrene-butadiene rubber (SBR), poly(acrylic acid) (PAA), sodium alginate (SA), polyvinylidene fluoride (PVDF), polyaniline (PANI), poly(9,9-dioctylfluorene-co-fluorenone-co-methyl benzoic ester) (PFM), polytetrafluoroethylene (PTFE), poly(ethylene oxide) (PEO), polyvinyl alcohol (PVA), polyacrylonitrile (PAN), sodium carboxymethyl chitosan (CCTS), poly(3,4-ethylenedioxythiophene) polystyrene sulfonate (PEDOT:PSS), 3,4-propylenedioxythiophene (ProDOT), dopamine hydrochloride, polyrotaxanes, polythiophene, combinations thereof, etc.), and/or other suitable materials. Dependent on the implementation, the anode can include (e.g., be composed of): anode active materials (e.g., carbon based such as graphite, graphitic carbon, carbon fibers, carbon nanotubes, carbon spheres, carbon nanorods, etc.; alloy materials such as aluminium, tin, magnesium, silver, antimony, their alloys, etc.; conversion-type materials (CTAM) such as transition-metal sulfides, oxides, hydroxides, phosphides, nitrides, carbides, fluorides, selenides, chalcogenides, oxalates, niobates, etc.; silicon materials; combinations thereof such as mixtures of graphite and silicon with between 1 and 99% silicon and the remainder graphite; lithium metal; etc.), conductive additive(s) (e.g., carbon black, carbon nanotubes, graphite, graphene, fullerenes, carbon fiber (VGCF), Super P Li, Super C65, Super C45, S-O, KS-6, KS-15, SFG-6, SFG-15, 350G, acetylene black, Kezin black, etc.), binder(s) (e.g., polyvinylidene fluoride (PVDF), styrene butadiene copolymer (SBR), carboxymethyl cellulose (CMC), polyacrylic acid (PAA), poly(vinyl alcohol) (PVA), humics, poly(3,4-ethylenedioxythio-phene)-polystyrenesulfonate (PEDOT: PSS), chitosan, alginate, etc.), and/or other suitable materials. Dependent on implementation, the separator 130 can include (e.g., be composed of) polymers (e.g., polyolefin such as polyethylene, polypropylene, polybutene, polymethylpentene, etc.; poly(tetrafluoroethylene); poly(vinyl chloride); etc.), nonwoven fibers (e.g., cotton, nylon, glass, polyester, etc.), natural substances (e.g., wood, rubber, asbestos, etc.), and/or of any suitable material. In some implementations, the separator can be ceramic coated. The electrolyte composition 140 may comprise a polymer component, a salt component, an additive component, a plasticizer component, and/or other suitable component(s) (e.g., as described above). Dependent on implementation, the polymer component can include urethane methacrylate and/or urethane acrylate (e.g., polyester urethane acrylates, polyester urethane methacrylates, polyether urethane acrylates, polycarbonate urethane acrylates, polycarbonate-polyether urethane acrylates, polycarbonate-polyester urethane acrylates, polyether-polyester urethane acrylates, polyimide urethane acrylates, polycarbonate urethane methacrylates, polycarbonate-polyether urethane methacrylates, polycarbonate-polyester urethane methacrylates, polyether-polyester urethane methacrylates, polyimide urethane methacrylates, polybutadiene urethane acrylates, polybutadiene urethane methacrylates, bisphenol A epoxy diacrylate, silicone urethane acrylate, thioether dendritic acrylates, thioether dendritic methacrylates, functional aliphatic polyether urethane acrylate, difunctional aromatic urethane acrylate, or difunctional aliphatic hydrophobic urethane acrylate, aminated urethane acrylate, aminated urethane methacrylate, etc.), butyl acrylate (or their monomer and/or oligomer constituents), and/or IBOA (e.g., where the components are polymerized in the activated state). In a variation of the exemplary battery system the electrolyte composition can include a polymer component, a salt component, and an additive component as described above. In another variation, the polymer component can include polyacrylamide, IBOA, and PEGDMA.

4. Method

Figure 2:
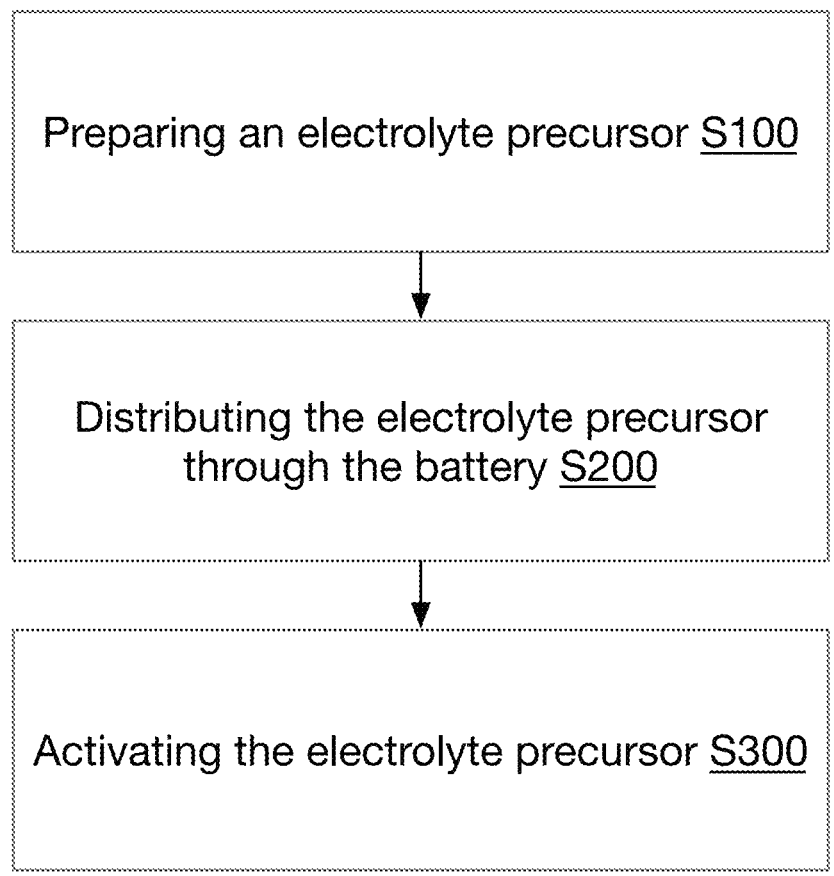
FIG. 2 is a flowchart representation of an example method.
Figure 3:
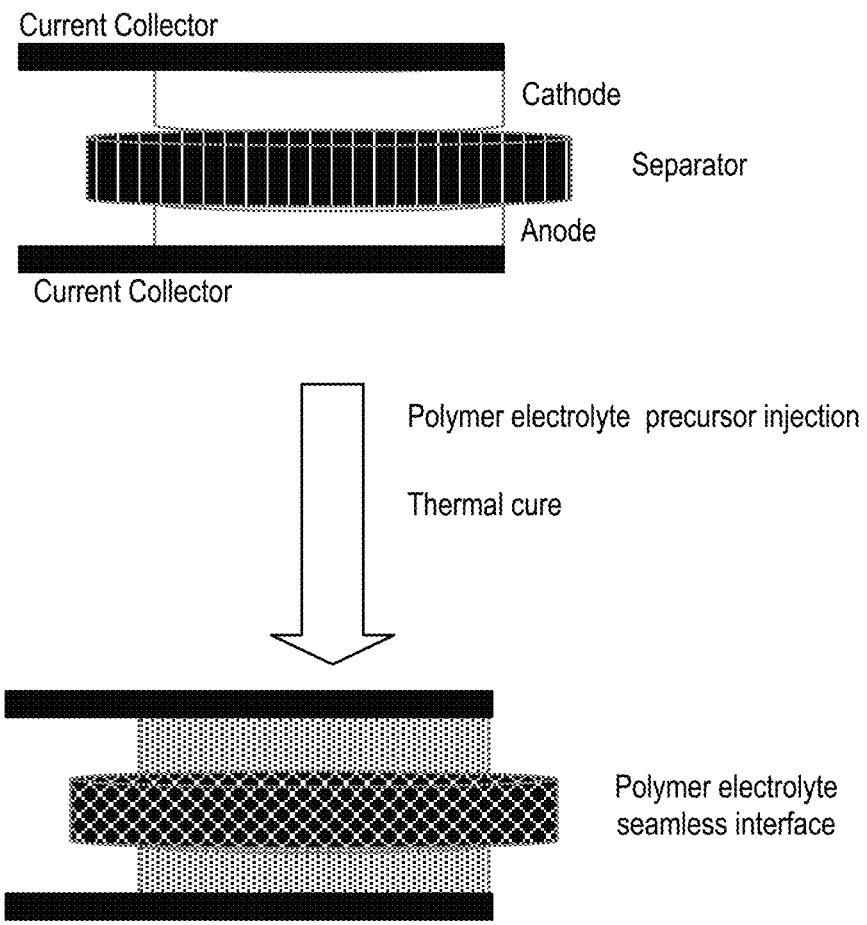
FIG. 3 is a schematic of the method implementation with a simple battery.
Figure 4:
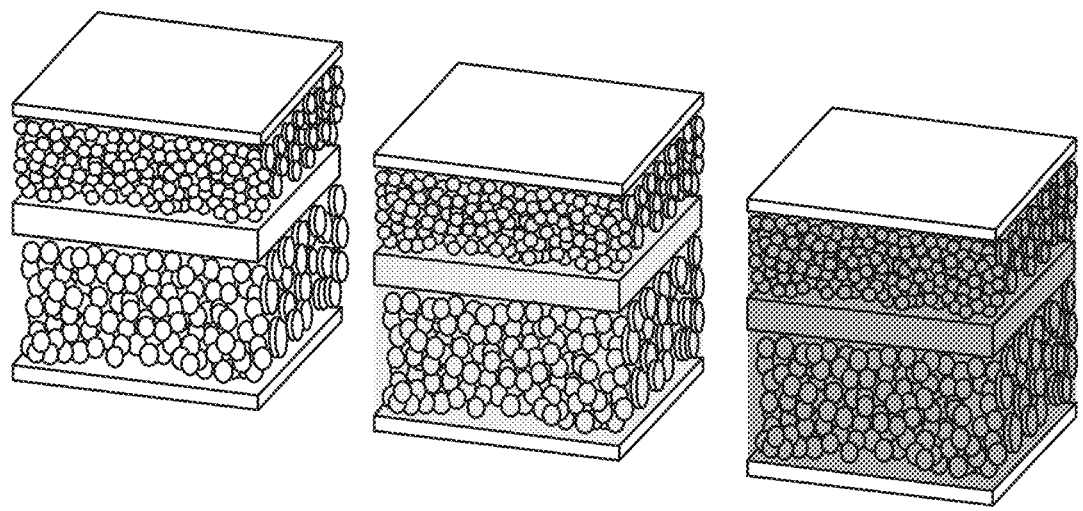
FIG. 4 is an image of the interface formed using the example method versus a conventionally constructed interface.

As shown in FIG. 2, a method for an in-situ polymer electrolyte formation for a battery comprises: preparing an electrolyte precursor S110; distributing the electrolyte precursor through the battery S120; and activating the electrolyte precursor S130, thereby converting the electrolyte precursor into the polymer electrolyte. The method functions to produce and incorporate a polymer electrolyte into a cavity space and porous material, wherein the polymer electrolyte provides a conductive medium for ion exchange (e.g., for ion exchange between battery electrodes) that is flexible and conductive. Thus, the method can provide the means to create and distribute a fully functioning electrolyte polymer through a battery (and/or other charge storage device), and through the battery components (e.g., battery separator and electrodes) that can function as a medium for ion exchange (i.e., enable or improve battery function). The method can be implemented with the composition as described above, but may be generally implemented with any applicable polymer composition. FIG. 3 shows a sample schematic of an example method implementation for a simple battery comprising an anode, cathode and separator; and FIG. 4 shows a battery image for the same method implementation.

The method provides a general prescription for production, incorporation, and activation of a polymer electrolyte that has a broad range of use cases. These use cases span different battery functionalities (e.g., structural batteries, high-energy density cells, general use, flexible batteries, etc.), battery types (e.g., lithium, lithium ion, cadmium, sodium ion, potassium ion, etc.), battery geometries (e.g., pouch, cylindrical, prismatic, coin, etc.), operational needs, work conditions (e.g., temperature of operation, operating voltage, charge and/or discharge rate, etc.), and/or other battery properties or electrolyte properties. Thus, the method can have some varying steps dependent on the desired implementation. For example, in many variations the method can include cycling the battery. In some variations, the method can include degassing the cell. The method can additionally or alternatively include other optional steps, including variations on incorporating and activating the electrolyte.

The method provides a range of variations for production and incorporation of an polymer electrolyte within a battery. In a first method example, the method can include producing an electrolyte precursor 110; outside of the battery, activating the electrolyte precursor S130; and then distributing the polymer electrolyte through the battery (S120). In this variation, the electrolyte polymer is first produced and then distributed through the battery. This variation may be utilized when the polymer electrolyte is fluid and can wet the battery with minimal processing.

In a second method example, the method can include producing the electrolyte precursor S110; distributing the electrolyte precursor through the battery S120; and within the battery, activating the electrolyte precursor S130. This method example can function to produce the polymer electrolyte within the battery (e.g., in situ gel electrolyte formation). Additionally, this method enables leveraging functional properties of the electrolyte precursor that are different than the activated polymer electrolyte (e.g., lower viscosity and improved wettability for distribution within the battery).

In a third method example, the method can include: producing the electrolyte precursor S110, and then the polymer electrolyte is created from the electrolyte precursor (S130) concurrent to distributing the electrolyte precursor through the battery S120. This method can be implemented in similar cases as the second method example. Additionally this method example, may be particularly useful in cases wherein the electrolyte precursor comprises multiple solution. In one variation of this third example, a first electrolyte precursor may be first distributed through the battery (S120). Once this distribution is complete a second electrolyte precursor, which contains a polymerization initiator can be distributed through the battery; thereby simultaneously dispersing through the battery as it converts the electrolyte precursor to the polymer electrolyte.

In a fourth method example, the method can include: concurrently producing an electrolyte precursor S110 and distributing the electrolyte precursor through the battery S120; and within the battery, activating the electrolyte precursor S130 to form the polymer electrolyte. This method example can be implemented in variations where it is necessary to distribute the electrolyte precursor as individual components. This may be the case where monomer and/or oligomer subunits (of polymers), or other components, have a low diffusivity or wettability, and the "layering" of components through the battery may better enable distribution of the components within the battery.

Thus, dependent on the desired use case, the method enables distribution of the electrolyte precursor and/or the electrolyte through battery (e.g., in an activated or unactivated state). Dependent on the desired implementation, the method thus enables production of an electrolyte precursor that may have distinct properties, as compared to the polymer electrolyte, and which can be leveraged for these distinct properties for improved battery production, and later improved battery functionality.

Preparing the electrolyte precursor S110 functions to combine one or more components of the polymer precursor. S110 preferably results in the formation of an inactive polymer electrolyte. However, S110 can (e.g., in combination with S130) result in an active polymer electrolyte.

S110 preferably forms an electrolyte precursor solution. The electrolyte precursor solution can include: solvent(s) (e.g., plasticizers), additive(s), polymer precursors (e.g., monomers, oligomers, polymer components, etc.), salt(s), initiator(s), inhibitor(s), and/or other suitable components.

In one variation, S110 can form two solutions: a first solution that can include plasticizer(s) (e.g., solvent(s)), additive(s), salt(s), inhibitor(s), and/or polymeric precursor(s) and a second solution that can include solvent(s) (typically but not necessarily the same solvent(s) as the first solution) and initiator(s). In another variation, S110 can form a single solution (e.g., including solvent(s), additive(s), salt(s), initiator(s), polymer precursor(s), initiator(s)). In another variation, S110 can include forming a mixture of polymer precursors and optionally inhibitor(s) or initiator(s), where in this variation a liquid electrolyte can be prepared and either combined with the mixture or already included in a battery. However, S110 can form any suitable solution.

The precise electrolyte precursor can be implementation dependent, but generally comprises combining (e.g., mixing, integrating, etc.) together polymer components (e.g., monomers, dimers, trimers, oligomers, etc., for a polymer compound; initiators; inhibitors; etc.), plasticizers, and other electrolyte components (e.g., salts and additives). In some variants, more viscous components of the electrolyte precursor solution can be combined first followed by less viscous components (e.g., polymer initiator). In other variants (e.g., when liquid oligomer, monomer, resins, polymer precursors, etc.), they the initiator can be added first and then homogenized with the other components. However, the components of the electrolyte precursor can be combined in any order (e.g., sequentially, simultaneously, contemporaneously, staggered, in alternating components until the target mixture is achieved, etc.).

In some variations, the electrolyte precursor can be prepared as multiple solutions. In these variations, these distinct solutions may be combined before and/or during incorporation/distribution through the battery (block S120) and/or during the polymer electrolyte construction (block S130).

For example, in one implementation, the electrolyte precursor may be divided into two solutions: a first solution including (e.g., consisting of, consisting essentially of, etc.) the polymer components, salts, and additives; and a second solution including (e.g., including only, consisting of, composed of, consisting essentially of, composed essentially of, etc.) the polymerization initiator and potentially other complementary additives.

A viscosity of the electrolyte precursor is preferably less than about 50 cP (e.g., 1 cP, 2 cP, 5 cP, 10 cP, 12 cP, 15 cP, 17 cP, 18 cP, 20 cP, 22 cP, 25 cP, 27 cP, 30 cP, 33 cP, 35 cP, 40 cP, 45 cP, 50.5 cP, 51 cP, values or ranges therebetween, etc.) at a wetting temperature (e.g., 0-100° C. such as 10° 20° C., 25° C., 30° C., 40° C., 50° C., 75° C., or other temperatures or ranges therebetween), which can be beneficial for subsequent steps of the method (e.g., dispersing the electrolyte precursor in the battery in S120) and/or for achieving a homogeneous electrolyte precursor solution. However, the viscosity can be greater than about 50 cP (e.g., one solution can have a viscosity greater than 50 cP and a second solution can have a viscosity less than 50 cP such that when the solutions are mixed the mixture of solutions has a viscosity less than 50 cP).

The electrolyte precursor solution(s) can include plasticizer(s) (e.g., solvent(s) such as described above, solvent mixture(s), salt(s) such as salt compounds as described above, additive(s) such as described above, etc. that can promote plasticity, flexibility, etc. in the cured polymer as formed in S130), polymer precursors (e.g., oligomers, monomers, etc. such as those described above), inhibitor(s) (such as described above), initiators (such as described above), and/or any suitable constituents.

The oligomers preferably function to form a polymer matrix that enables ionic transport throughout the polymer. In some variants, the oligomers can be difunctional oligomers (e.g., feature polymerizable groups on two sites such as two accessible vinyl groups, as shown for example in FIG. 4) which can facilitate and/or enable the formation of a crosslinked polymer network (upon polymerization). The oligomer is typically a co-oligomer (e.g., made from two or more monomers) but could be a homooligomer. The co-oligomer can be an alternative co-oligomer (e.g., A-B-A-B-A-B for monomers A and B), random co-oligomer, block co-oligomer (e.g., A-A-A-A-B-B-B-B for monomers A and B), graft co-oligomer, and/or can have any suitable structure.

The oligomers preferably have non-polar backbone (e.g., hydrocarbon, aliphatic, aromatic, etc. such as methylene, ethylene, propylene, butylene, pentalene, hexylene, heptylene, octylene, nonylene, decylene, etc. where the aliphatic groups can be linear, branched, cyclic, bridge, spiro, etc.) linked by polar groups (e.g., carbonate, ester, ketone, carbamide, carbamate, thiocarbamate, thiocarbamide, thiocarbonate, dithiocarbonate, ether, thioether, imide, imine, epoxide, amide, acid anhydride, nitrile, amidine, cyanate, isocyanate, nitrosooxy, nitro, nitroso, oxime, sulfinyl, sulfonyl, sulfonate ester, sulfone, thiocyanate, isothiocyanate, thioester, dithiocarboxylic acid ester, etc.).

The oligomer is preferably terminated with an acrylate and/or methacrylate group (to facilitate polymer formation). However, the oligomer can additionally or alternatively be terminated with any suitable end group (e.g., epoxy, thiol, imide, cyanoacrylate, etc.). In a preferred variant, the oligomer can include a urethane (e.g., a carbamate functional group), urea (e.g., a ureido functional group), and/or amide (e.g., a carboxamide functional group) between the acrylate and the rest of the oligomer. In another variant, the functional group can form a pendant group (e.g., in addition to or as an alternative to the functional group within a backbone of the oligomer and/or cured polymer formed by polymerizing the oligomers and/or monomers). However, the oligomer can include any suitable structure. For example, a urethane acrylate and/or urethane methacrylate (e.g., a monofunctional aliphatic hydrophobic urethane acrylate, difunctional aliphatic hydrophobic urethane acrylate, aromatic hydrophobic urethane acrylate, a monofunctional aliphatic hydrophobic urethane methacrylate, difunctional aliphatic hydrophobic urethane methacrylate, aromatic hydrophobic urethane methacrylate, polyester urethane acrylates, polyester urethane methacrylates, polyether urethane acrylates, polycarbonate urethane acrylates, polycarbonate-polyether urethane acrylates, polycarbonate-polyester urethane acrylates, polyether-polyester urethane acrylates, polyimide urethane acrylates, polycarbonate urethane methacrylates, polycarbonate-polyether urethane methacrylates, polycarbonate-polyester urethane methacrylates, polyether-polyester urethane methacrylates, polyimide urethane methacrylates, polybutadiene urethane acrylates, polybutadiene urethane methacrylates, bisphenol A epoxy diacrylate, silicone urethane acrylate, thioether dendritic acrylates, thioether dendritic methacrylates, functional aliphatic polyether urethane acrylate, difunctional aromatic urethane acrylate, or difunctional aliphatic hydrophobic urethane acrylate, oligomers as described above, etc.) can be used as the oligomer.

The monomers preferably function to modify (e.g., decrease) a viscosity of the precursor solution. However, the monomers can additionally or alternatively function to modify properties of the polymer (e.g., resulting properties of the cured polymer such as crosslinking density, toughness, flexibility, adhesion, etc.). Exemplary monomers include: isobornyl acrylate (IBOA), trimethylolpropane triacrylate (TMPTA), tripropylene glycol diacrylate (TPGDA), 1,6-hexanediol diacrylate (HDDA), (hydroxyethyl)methacrylate (HEMA), and/or other suitable monomers. In an illustrative example, a polymer precursor can include 10-90% (e.g., wt %, vol %, stoichiometric %, etc.) oligomer where the remainder of the polymer precursor is monomer. In another illustrative example, the polymer precursor can include (e.g., consist of, be composed of, consist essentially of, be composed essentially of, etc.) oligomers. However, the polymer precursor can have any suitable composition.

Distributing the electrolyte precursor S120 functions to incorporate the electrolyte precursor into the battery and disperse the electrolyte precursor through the appropriate battery components (e.g., battery separator and electrodes). Distributing the electrolyte precursor through the battery S120 an depend on the battery (e.g., type, size, shape, electrode type(s), separator type, electrode materials, electrode active material porosity, separator porosity, separator material, etc.). The battery is preferably a dry battery stack (e.g., battery that only excludes an electrolyte; an anode, separator, and cathode within a housing or casing; battery cell that does not have electrolyte; etc.). However, the battery can be a liquid battery (e.g., functional battery cell, battery stack including liquid electrolyte, etc.). Although referred to as distributing the electrolyte "precursor" through the battery S120, as the order of method steps is not fixed; in some variations, S120 can include distributing the polymer electrolyte (e.g., activated polymer electrolyte precursor, polymerized electrolyte precursor, etc.) or distributing electrolyte precursor solution. In these variations, S120 functions to distribute the active functioning electrolyte through the battery or distributing electrolyte components through the battery.

The electrolyte is preferably homogeneously distributed throughout the battery such that each component is substantially homogeneously distributed (e.g., minimal concentration gradient or difference in concentration of electrolyte components within different areas of the battery). However, the electrolyte can be inhomogeneously distributed throughout the battery (e.g., higher concentrations of polymer precursors in the electrodes, lower concentrations of polymer precursors in the electrodes, higher concentrations of polymer precursors in the separator, lower concentrations of polymer precursors in the separator, etc.).

In many variations, distributing the electrolyte precursor through the battery S120 can include injecting the electrolyte precursor into the battery. This may be dependent on the battery type and/or geometry. For example, for a battery pouch implementation, the electrolyte precursor may be directly injected into the battery pouch, onto the separator, and/or onto the electrodes within the battery. This technique may also be implemented for other battery geometries (e.g., cylindrical cells and prismatic cells). For a coin battery, a pipette may be used to directly inject the electrolyte solution onto the electrodes and the separator. Injecting the electrolyte precursor may include multiple injections. However, the electrolyte precursors can additionally or alternatively be added dropwise, using a syringe pump, pouring, and/or using any suitable process(es).

In some variants, a plurality of injections of electrolyte precursor solutions can be performed. In one such implementation, a first injection can be performed with a lower viscosity electrolyte precursor solution (e.g., viscosity less than about 30 cP) followed by an injection with a higher viscosity electrolyte precursor solution (e.g., viscosity greater than or equal to about 30 cP such as formed by a solution with the same constituents as the lower viscosity solution but with a higher concentration of polymer precursor(s)) where the lower viscosity solution can facilitate wetting of the battery components and facilitate wetting of the battery by constituents of the higher viscosity solution.

The electrolyte precursor solution is preferably injected into the battery in a controlled environment (e.g., glove box or similar environmental control, under an inert atmosphere, clean room, etc.) to minimize the introduction of undesired materials into the battery (particularly but not limited to water). However, the electrolyte precursor solution can be injected into the battery in any suitable environment.

For improved incorporation of the electrolyte, S120 can include allowing time for the electrolyte to "soak" into the battery and battery components (e.g., to wet the battery components—also referred to as aging or wet aging, where the phrase wet aging is used to distinguish from battery aging at an electrical potential). In some variations, the battery may be allowed to soak for some set time period (e.g., 1 hour, 2 hours, 4 hours, 6 hours, 8 hours, 10 hours, 12 hours 15 hours, 18 hours, 24 hours, 30 hours, 36 hours, 48 hours, 72 hours, 96 hours, 120 hours, 144 hours, values or ranges therebetween, etc.).

In some variations, a pressure, or negative pressure (e.g., vacuum), may be implemented to aid drawing and/or forcing the electrolyte into the battery components. In some variations a small directional charge (e.g., charging the battery, discharging the battery) may be sent through the battery to aid in electrolyte distribution (e.g., via electrowetting). Any additional means may be used (e.g., massaging, agitating, applying alternating pressures, rolling, centrifuging, etc.) to improve soaking of the battery components. During the wetting aging, the battery and electrolyte (e.g., polymer electrolyte precursor solution) can be maintained at ambient temperature, at a controlled temperature (e.g., room temperature, 20-25° C., etc.), at an elevated temperature (a temperature or range thereof between 25-100° C. such as 30° C., 40° C., 50° C., 60° C., etc. where the temperature preferably does not exceed the boiling point of components of the polymer precursor solution at the vacuum pressure), and/or at a depressed temperature (e.g., less than about 20° C. where the temperature is preferably not below a freezing point of components of the polymer precursor solution).

As an illustrative example, pulsed vacuum (e.g., repeated applications of negative pressure followed by periods at ambient or increased pressure such as 2 vacuum cycles, 3 vacuum cycles, 4 vacuum cycles, 5 vacuum cycles, 7 vacuum cycles, 10 vacuum cycles, 20 vacuum cycles, 50 vacuum cycles, etc.) can be used to induce or promote wetting of the battery components with the polymeric precursor solution. The pressure during the vacuum phases is preferably less than about 100 kPa (e.g., <1 Bar, <0.95 Bar, <0.92 Bar, <0.9 Bar, <0.8 Bar, <0.75 Bar, <0.5 Bar, <0.1 Bar, <0.05 Bar, <0.01 Bar, etc.). Typically, the same vacuum pressure is used for each phase. However, different vacuum pressures can be used for successive phases (e.g., utilizing lower vacuum pressures, i.e., stronger vacuums, for later phases; utilizing high vacuum pressures, i.e., weaker vacuums, for later phases; etc.). Each phase (e.g., vacuum and ambient pressure phases, each vacuum phase, each ambient pressure phase) can have the same duration or different durations (e.g., each vacuum phase is the same duration and each ambient pressure phase is the same, but the vacuum phase and ambient pressure phase durations are different). The phase duration can be between about 1 minute and 24 hours (e.g., 30 sec, 45 sec, 60 sec, 90 sec, 120 sec, 3 min, 5 min, 7 min, 10 min, 15 min, 20 min, 30 min, 45 min, 60 min, 90 min, 120 min, 3 hours, 5 hours, 6 hours, 8 hours, 12 hours, 16 hours, 24 hours, values or ranges therebetween). The pulsed vacuum wetting can be performed at ambient temperature (e.g., room temperature, about 20-25° C.), an elevated temperature (e.g., a temperature or range thereof between 25-100° C. where the temperature preferably does not exceed the boiling point of components of the polymer precursor solution at the vacuum pressure), and/or a depressed temperature (e.g., less than about 20° C. where the temperature is preferably not below a freezing point of components of the polymer precursor solution). In some variations, rather than ambient pressure, the vacuum pressure can be alternated with phases of elevated pressure. In other variations, phases of ambient pressure can be alternated with periods of elevated pressure (e.g., >1.05 Bar, >1.1 Bar, >1.2 Bar, >1.3 Bar, >1.4 Bar, >1.5 Bar, >2 Bar, >5 Bar, >10 Bar, etc.). In other variations, a polyphasic (e.g., including intermixing vacuum, ambient, and elevated pressure; including different temperature phases, etc.) process can be used to improve wetting of the battery components. However, wetting can otherwise be promoted.

In some variations, the battery cell can be sealed after injection (e.g., immediately after injection, contemporaneously with injection, etc.). Sealing the battery can include welding, gluing, adhering, loose-seal, cure-in-place, form-in-place, using a gasket, using tape (e.g., low surface energy tape, acrylic foam tapes, etc.), and/or can be sealed in any manner. Alternatively, the battery cell can be left open (e.g., to an environment adjacent to the battery during wetting and curing).

Dependent on implementation (e.g., batteries that include copper current collectors), distributing the electrode precursor through the battery S120 may include passing a tap charge through the battery. The tap charge can be beneficial for hindering, decreasing, or preventing copper dissolution by raising the potential of the cell and/or can otherwise improve a stability of the battery. The tap charge is preferably between 1.5 and 2.2 V. However, the tap charge can be less than 1.5 V or greater than 2.2 V. The tap charge can be applied before, during, and/or after aging (e.g., wet aging) the battery and polymeric electrolyte precursor solution. Similarly, the tap charge can be applied before, during, and/or after vacuum pulses have been applied.

Activating the electrolyte precursor S130 functions to convert the electrolyte precursor solution (e.g., polymer precursor thereof) into a functioning ionically conducting medium (e.g., polymer electrolyte, gel electrolyte, polymerized polymer precursors, etc.). Activating the electrolyte precursor solution can also be referred to as and/or include curing the polymer electrolyte precursor solution, setting the polymer electrolyte precursor solution, polymerizing the polymer electrolyte precursor solution (e.g., polymer precursor thereof), initiate polymerization of the polymer precursor, and/or other related processes. Dependent on implementation, S130 can require additional steps to construct/activate the polymer electrolyte precursor solution beyond electrolyte polymerization (e.g., running a charge through, or heating the electrolyte precursor). S130 is preferably performed inside the battery (e.g., in situ polymerization, in situ activation, after S120). However, S130 can be performed outside the battery (e.g., ex situ polymerization, ex situ activation, prior to S120) and/or while the polymer electrolyte precursor solution is wetting the battery components (e.g., during S120).

As part of activating the electrolyte precursor S130, properties of the electrolyte composition typically change. In addition to improved ionic conductivity, the composition can change state (e.g., solidify or become gel-like from a liquid state), decrease in wettability, improve adhesion, improve toughness, increased flexibility of the battery, etc. As mentioned above, dependent on implementation, activating the polymer electrolyte precursor solution S130 may occur concurrent with S110 and/or S120 or separately.

In many variations, activating the electrolyte precursor S130 comprises a curing process. The curing process can depend on the polymer precursor, the initiator, and/or other suitable aspects of the system. Examples of curing processes include: mechanical curing (e.g., where curing is initiated by a threshold pressure or force), thermal curing (e.g., where curing is initiated by increasing a temperature of the polymer electrolyte precursor solution), electrochemical curing (e.g., where curing is initiated by an electric potential applied to the polymer electrolyte precursor solution), electromagnetic curing (e.g., where curing is initiated by illumination of the polymer electrolyte precursor solution with electromagnetic radiation of sufficient wavelength, intensity, photon flux, etc.), combinations thereof, and/or other suitable curing mechanisms.

Figure 16:
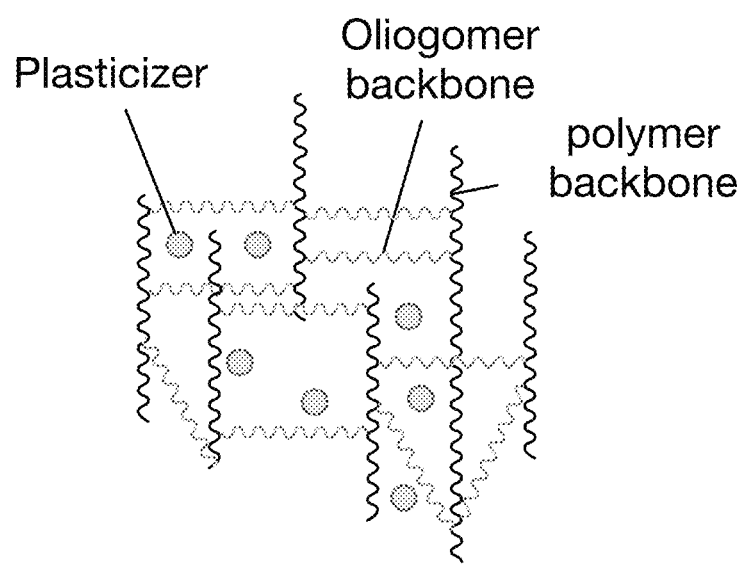
FIG. 16 is a schematic representation of an example of a cured gel electrolyte with a crosslinked structure.

Curing the polymer electrolyte precursor solution preferably results in a crosslinked polymer electrolyte (as shown for example in FIG. 16). In a specific example, the crosslinked polymer electrolyte can be in a gel-like state that contains plasticizers, salt, and/or additives; where the crosslinked polymer electrolyte forms an interconnected structure through the battery electrodes and separator. In some variations, the crosslinked polymer electrolyte can form a ladder like compound. In another specific example, the polymer can include one or more hydrocarbon backbone (e.g., formed from polymerization of vinyl groups from acrylate, methacrylate, etc.) with oligomer moieties and/or monomer moieties forming pendant groups or side groups (e.g., in the example as shown in FIG. 16, the oligomer backbone shown in grey can be considered a pendant or side group of the polymer backbone shown in black that results from polymerization between vinyl groups of the oligomer and/or monomer). The oligomers and/or monomers can connect to a single polymer backbone at a single location, can connect to a single polymer backbone at a plurality of locations, can connect to multiple polymer backbones (e.g., each end of the oligomer can be integrated into a different polymer backbone within the crosslinked network), and/or can otherwise be connected to any suitable backbone region. The polymer can additionally or alternatively for a linear, block, branched, and/or polymer with any suitable structure.

The crosslinked polymer (e.g., gel electrolyte, covalently bonded gel electrolyte network, etc.) preferably includes ionically conductive domains. The ionically conductive domains can be formed, for example, from the polar functional groups within the oligomers forming an ionic transport network. The result can be an ionically conductive polymer electrolyte (e.g., with an ionic conductivity >0.1 mS/cm at 25° C.).

Operating parameters of the curing process such as curing temperature, curing time, curing pressure, curing mechanism, and/or other operating parameters can depend on a battery application, a target battery property (e.g., toughness, flexibility, energy density, charging rate, etc.), a target electrolyte property (e.g., ionic conductivity, crosslinking density, state of matter, etc.), solution constituents (e.g., initiator material, polymer precursor, etc.), and/or can otherwise depend. For instance, a lower crosslinking density (correlated with a degree of completion of the polymerization process, extent of full curing, etc. and measurable using swelling tests such as according to ASTM standard D2765 or F2214, using rheological measurements, dynamic mechanical analysis, etc.) can be achieved by performing the curing process for a shorter duration, performing the curing process at a lower activation energy (e.g., lower temperature), increasing an inhibitor concentration in the precursor solution, and/or can otherwise be controlled.

Depending on the battery type, battery cell geometry, curing method and the implemented electrolyte composition, an external pressure may, or may not, be applied to the battery and/or the electrolyte (e.g., a 5-1000 psi may be applied). This process can be referred to as fixturing the battery. The external pressure is preferably applied uniformly across the battery, but can be applied in a nonuniform manner (e.g., greater pressure along an edge of the battery, greater pressure in a center of the battery, etc.).

Dependent on implementation, curing the electrolyte precursor solution may take from approximately half an hour to one week (e.g., 15 minutes, 30 minutes, 45 minutes, 60 minutes, 90 minutes, 120 minutes, 240 minutes, 6 hours, 8 hours, 12 hours, 15 hours, 18 hours, 24 hours, 36 hours, 48 hours, 72 hours, 96 hours, 144 hours, values or ranges therebetween, etc.). In some variations, curing may take longer.

In variants that use thermal curing, the electrolyte precursor solution can be cured at a temperature between about 60-80° C. However, a lower temperature can be used.

In variants that use electrochemical curing, the electrolyte precursor solution can be cured at a nominal electric potential between about 2.4 and 4.2 V. However, the electrolyte precursor can be cured at any suitable electric potential.

In one coin battery example, a coin battery can be cured on a 80° C. hot plate or in an 80° C. oven for two hours. In one pouch battery example, the pouch is clamped in place such that a pressure of 5 psi is applied uniformly to the cell and it is cured for two hours at 80° C. In one curing process, the temperature is raised directly to the desired curing temperature (e.g., 80° C.). In another example of the curing process, a temperature ramp is incorporated, wherein the temperature is incrementally increased to the desired curing temperature. In a second pouch battery example, the cell is cured for 7 hours, without the application of any external pressure, wherein the temperature is gradually increased in small increments (e.g., 5° C.) up to 80° C., wherein the battery is allowed to fully equilibrate at a temperature prior to raising the temperature to the next increment.

Alternatively, other methods of electrolyte polymerization/activation may be incorporated, or multiple activation methods may be used in conjunction. In another variation, activating the electrolyte precursor S120 may comprise an initiation of the polymerization process by applying electrochemical techniques. That is, a charge may be run through the battery, or just through the electrolyte solution, thereby setting the electrolyte through interactions with other electrolyte components (e.g. the salt). In another variation, a time-delayed initiation of polymerization can be incorporated.

In some variations, wherein preparing the electrolyte precursor S110 comprises making multiple solutions, S130 can include combining the multiple solutions. For example, S130 can include combining the polymerization initiator solution and polymer electrolyte precursor solution. This may be as part of a curing process, wherein the composition is simultaneously heated, and/or as part of another activation/polymerization process (e.g., premixing the solutions prior to introduction of an activation mechanism).

In some variations, the method can include cycling the battery S140. Cycling the battery can function to create a solid-electrode interface (SEI) between the electrodes and the electrolyte, prelithiating an anode, store energy in the battery (or other energy storage device), and/or can otherwise function. S140 (and S130) can be performed in a formation cabinet (e.g., a cabinet configured to maintain a plurality of batteries each at a target temperature, pressure, electric potential, electrical current, atmosphere, and/or other suitable conditions) and/or in any suitable system. S140 is typically performed after S130. However, S140 can be performed before and/or concurrent with S130. As a specific example, S140 can be performed before the polymer electrolyte precursor solution(s) are fully cured (e.g., have achieved a final crosslinking density, have achieved a target ionic conductivity, target toughness, target adhesion, targeting wetting, etc.). In this example, the applied polarization may enable additional or completion of the curing process.

Figure 5:
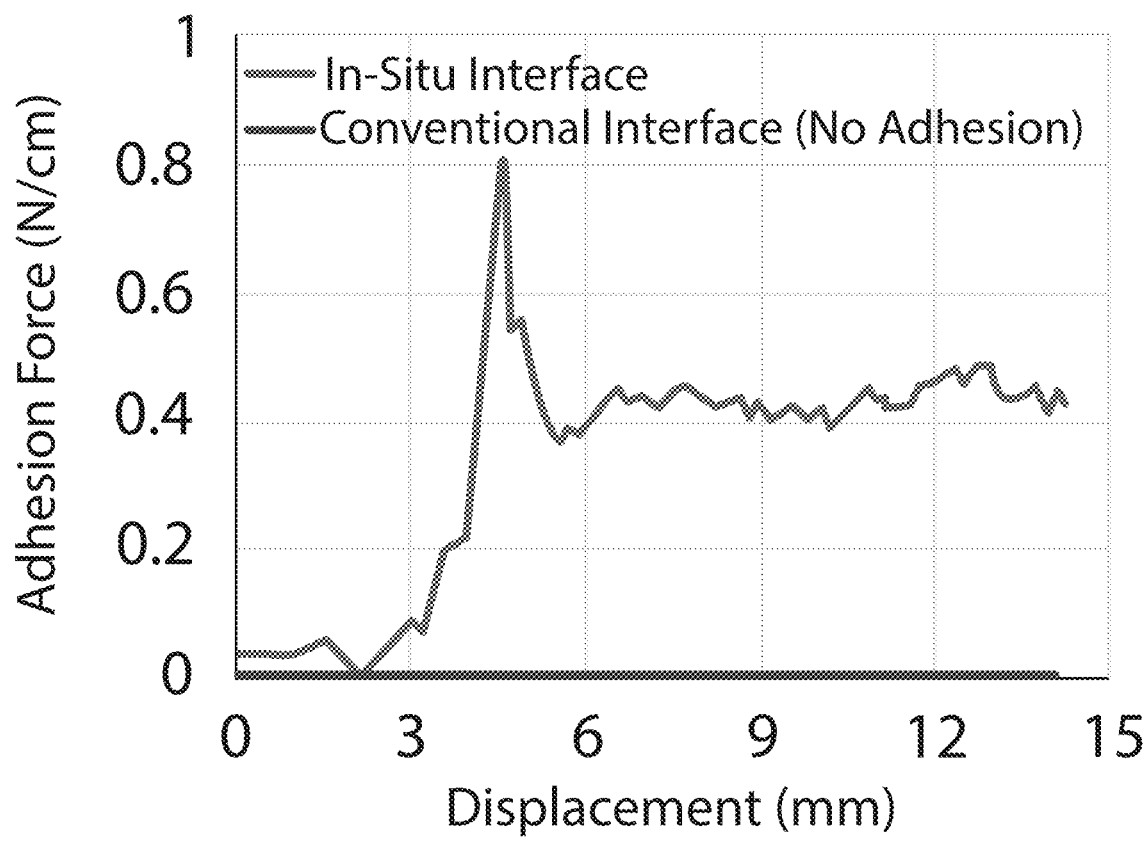
FIG. 5 is a table comparing the conductivity of the polymer electrolyte to liquid electrolytes.
Figure 6:
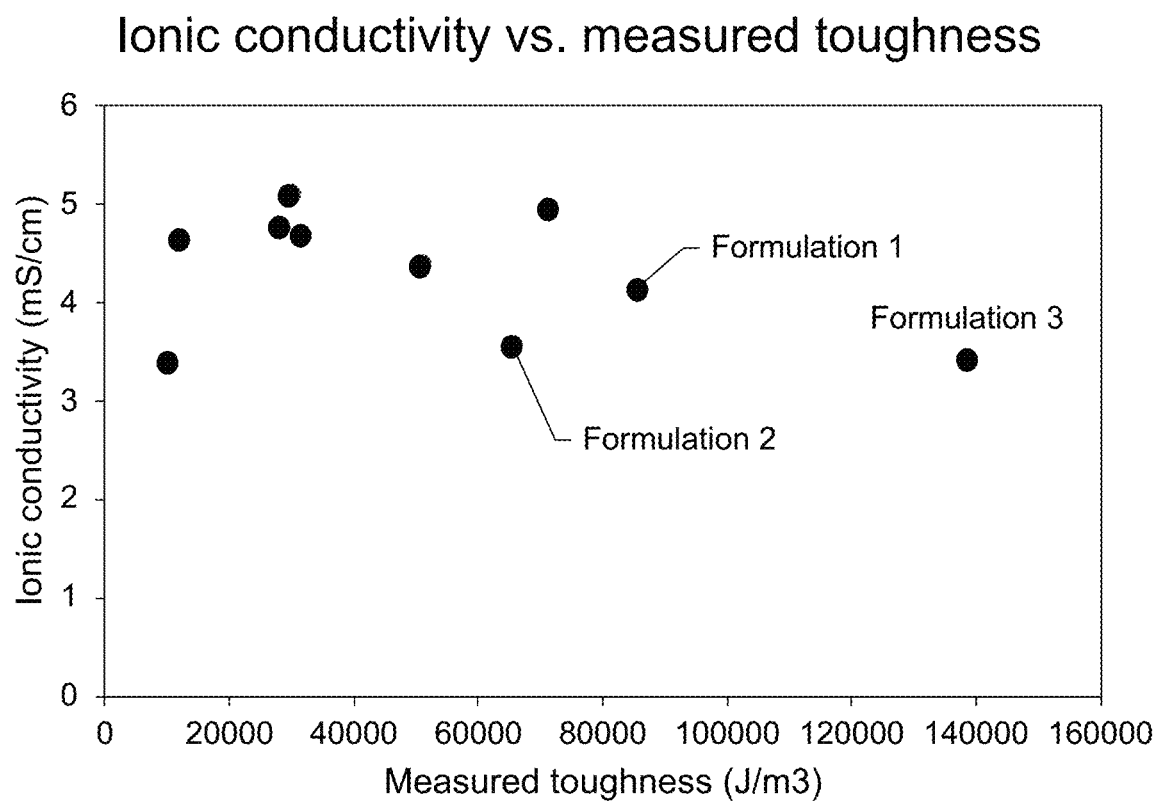
FIG. 6 is a graph showing the toughness and ionic conductivity of example compositions.
Figure 7:
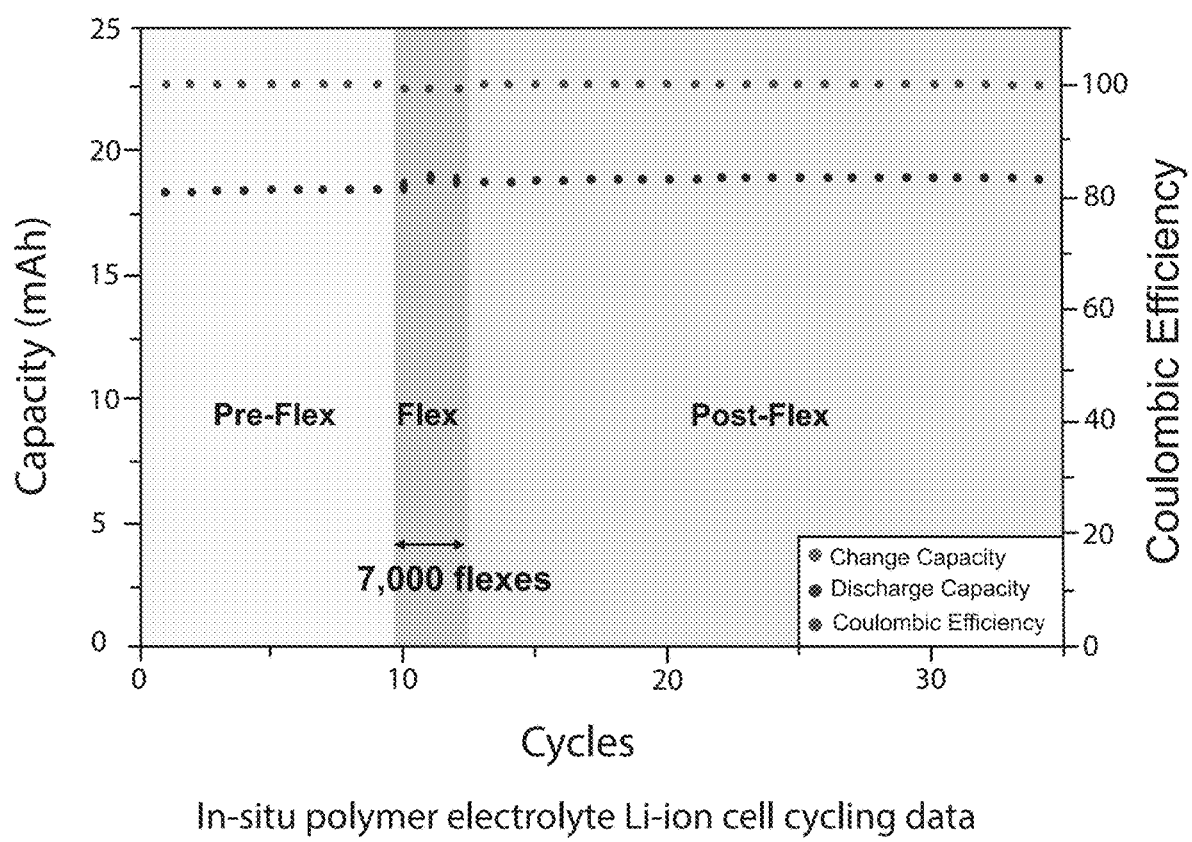
FIG. 7 is a graph demonstrating the capacity and coulombic efficiency of the polymer electrolyte after battery flexion.

Due to soaking and in-situ incorporation of the electrolyte, the time taken to form the batteries may be less as compared to conventional batteries (e.g., electrochemical aging time can be reduced compared to variations that do not include wetting aging). In some variations, initial cycling of the battery may include the application of external pressure and may also include cycling at elevated temperature. Additionally, as shown in FIGS. 5 and 6, in-situ incorporation of the electrolyte can lead to improved electrode/electrolyte adhesion as well as a unique combination of high conductivity and high toughness. Additionally, as shown in FIG. 7, incorporation of the electrolyte polymer can enable the battery to withstand significant cycles of flexing without degraded cycling performance or loss of cell capacity. Similarly, incorporation of the polymer electrolyte can facilitate improved resilience to battery puncturing (e.g., a battery can continue to function without significant thermal runaway after being punctured).

In one battery cycling implementation, a battery cell may be attached to a potentiostat or cycler. Through the cycler, voltage holds may be performed on the battery, constant current for specified amounts of time (e.g., charging/discharging the cell) may be passed through the battery, elevated temperatures or temperature ramps may be applied to the battery, and/or the battery can be fixtured at target pressure.

In some variations, the method may further include a degassing the cell. Degassing the cell functions to remove gasses, and sometimes liquids, formed in the battery cell during electrolyte incorporation and/or activation (e.g., formed by degradation of the initiator, formed by the polymerization reaction, etc.) and/or SEI layer formation. Degassing the cell may vary greatly depending on battery type. This can be performed using the degassing method built into the battery. Alternatively, degassing the cell can include opening (e.g., via puncturing, unsealing, etc.) the cell, releasing the gas(es) (e.g., applying a vacuum, degasification, etc.), and sealing the cell after degasification has been completed.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30% of a reference), or be otherwise interpreted.

As a person skilled in the art will recognize from the previous detailed description and from the figures and claims, modifications and changes can be made to the embodiments of the invention without departing from the scope of this invention as defined in the following claims.

Specific Examples

In a first specific example, an electrolyte polymer composition comprises a polymer component, comprising a concentration of 8%-80% by weight of the electrolyte composition, that provides for dynamic and covalent crosslinking in an activated state; a salt component, comprising a concentration of 8%-40%, by weight, of the electrolyte composition, comprising at least one salt compound; and a plasticizer component, comprising a concentration of 1%-80%, by weight, of the electrolyte composition, comprising at least one plasticizer compound. In variations of the first specific example, the electrolyte polymer composition has two states: a preactivated state, wherein the electrolyte polymer composition comprises a solution; and the activated state, wherein the electrolyte polymer composition comprises a freestanding form consisting of a gel state or a solid state. In variations of the first specific example, the polymer component comprises an oligomer that includes: at least one polar functional group; and at least one polymerizable functional group. In variations of the first specific example or variations thereof, the at least one polar functional group is selected from a list consisting of: carbamide, carbamate, imine, boronic esters, and ionic chelating domains; the at least one polymerizable functional group is selected from a list consisting of: acrylate, methacrylate, cyanoacrylate, epoxy, imide, and thiol; the plasticizer is selected from the list consisting of: ethylene carbonate (EC), diethyl carbonate (DEC), dimethyl carbonate (DMC), ethyl methyl carbonate (EMC), propylene carbonate (PC), vinylene carbonate (VC), dimethoxyethane (DME), diethyl ether, tetrahydrofuran (THF), methyl formate (MF), ethyl formate (EF), methyl propionate (MP), methyl butanoate, ethyl formate (EF), ethyl acetate (EA), ethyl propionate (EP), propyl formate, propyl acetate (PA), propyl proprionate (PP), glyme, diglyme, triglyme, tetraglyme, and combinations thereof. In variations of the first specific example, the electrolyte formulation further comprises an additive (e.g., 1-10 wt %) selected from the list consisting of: 1,3,2-dioxathiolane-2, 2-dioxide (DTD), vinyl acetate (VA), 2-vinyl pyridine (VP), fluoroethylene carbonate (FEC), trivinylcyclotriboroxane (tVCBO), VC, LiDFOB, LiBOB, sulfone, ethyl methyl sulfone, tetramethyl sulfone (TMS), prop-1-ene-1,3-sulfone (PES), 1,3-propane sultone (PS), cyclic sulfate, dioxolone, 5-methyl-4-((trifluoromethoxy)methyl)-1,3-dioxol-2-one, phenyl boronic acid glycol ester (PBE), 5-methyl-4-((trimethylsilyloxy)methyl)-1,3-dioxol-2-one, trimethylphosphate (TMP), triethylphosphate (TEP), tributylphosphate (TBP), triphenylphosphate (TPP), tris(2,2,2-trifluoroethyl)phosphate (TFP), methyl P,P-bis(2,2,2-trifluoroethyl)phosphate (BMP), trimethylphosphite (TMPi), tris(2,2,2-trifluoroethyl)phosphite (TTFPi), dimethyl methyl phosphate (DMMP), diethyl ethylphosphate (DEEP), bis(2,2,2-trifluoroethyl) methylphosphate (TFMP), bis(2,2,2-trifluoroethyl) ethylphosphate (TFEP), hexa(methoxy)cyclotriphosphazene (HMOCPN), (ethoxy)pentafluorocyclotriphosphazene (PFPN), (phenoxy)pentafluorocyclotriphosphazene (FPPN), and combinations thereof. In variations of the first specific example or variations thereof, the electrolyte formulation comprises an initiator (e.g., 1-10 wt % relative to the polymer precursor, oligomer, monomer, etc.) comprising at least one compound selected from a list consisting of: 1-1'-azobis(cyclohexanecarbonitrile), 2,2'-azobisisobutyronitrile (AIBN), 2,2-Bis(tert-butylperoxy)butane, 1,1-bis(tert-butylperoxy)cyclohexane, 2,2'-azobis[2-(2-imidazolin-2-yl)-propane] dihydrochloride, 2,5-bis(tert-butylperoxy)-2, 5-dimethylhexane, 2,5-bis(tert-butylperoxy)-2,5-dimethyl-3-hexyne, bis(1-(tertbutylperoxy)-1-methylethyl)benzene, 1,1-bis(tert-butylperoxy)-3,3,5-trimethylcyclohexane, tert-butyl peracetate, tert-butyl hydroperoxide (TBHP), cumene hydroperoxide, di-tert-butyl peroxide, tert-butyl peroxybenzoate, tert-butylperoxyisopropyl carbonate, dicumyl peroxide, benzoyl peroxide, lauroyl peroxide, 2,4-pentanedione peroxide, peracetic acid, tert-amyl peroxybenzoate, 4,4-azobis(4-cyanovaleric acid), 1,1'-azobis(cyclohexanecarbonitrile) (ABCN or ACHN), ammonium persulfate, potassium persulfate (or other persulfate salts), lauroyl peroxide, tert-butyl peroxide, tert-butyl peroxybenzoate, benzoyl peroxide (BPO), phenylbis(2,4,6-trimethylbenzoyl)phosphine oxide), 2,2-dimethoxy-2-phenylacetophenone (DMPA), and combinations thereof. In variations of the first specific example or variations thereof, the electrolyte formulation further comprises an inhibitor (e.g., 500 ppm-1 wt % relative to the polymer precursor, oligomers, monomers) selected from a list consisting of: phenothiazine (PTZ), butylated hydroxytoluene (BHT), hydroquinones (HQ), 4-methoxyphenol (MEHQ), monobenzone, hydroquinone, guaiacol, 2-hydroxy-5-methoxybenzaldehyde, 1,2-benzoquinone, 1,4-benzoquinone, 1,4-naphthoquinone, 9,10-anthraquinone, chloranil, quinone methide, p-phenylenediamines, diethylhydroxylamine, hydroxylhydroxylamine, (2,2,6,6-Tetramethylpiperidin-1-yl)oxyl (TEMPO), 4-hydroxy-TEMPO (TEMPOL), and combinations thereof. In variations of the first specific example or variations thereof, the oligomer comprises at least one of a urethane acrylate or a urethane methacrylate (e.g., one or more of: polyester urethane acrylates, polyester urethane methacrylates, polyether urethane acrylates, polycarbonate urethane acrylates, polycarbonate-polyether urethane acrylates, polycarbonate-polyester urethane acrylates, polyether-polyester urethane acrylates, polyimide urethane acrylates, polycarbonate urethane methacrylates, polycarbonate-polyether urethane methacrylates, polycarbonate-polyester urethane methacrylates, polyether-polyester urethane methacrylates, polyimide urethane methacrylates, polybutadiene urethane acrylates, polybutadiene urethane methacrylates, bisphenol A epoxy diacrylate, silicone urethane acrylate, thioether dendritic acrylates, thioether dendritic methacrylates, functional aliphatic polyether urethane acrylate, difunctional aromatic urethane acrylate, difunctional aliphatic hydrophobic urethane acrylate, aminated urethane acrylates, aminated urethane methacrylates). In other variations of the first specific example or variations thereof, the oligomer comprises at least one of a urethane epoxy or a urea epoxy and optionally a crosslinking epoxy (e.g., a polyether, polycarbonate, polyester, polyurethane, combinations thereof, etc. multifunctional epoxy with two or more epoxy head groups available for covalent crosslinking). In other variations of the first specific example or variations thereof, the oligomer comprises at least one of a urethane imide or a urea imide and optionally a crosslinking imide (e.g., a polyether, polycarbonate, polyester, polyurethane, combinations thereof, etc. multifunctional imide with two or more imide head groups available for covalent crosslinking). In other variations of the first specific example or variations thereof, the oligomer comprises at least one of a urethane thiol or a urea thiol and optionally a crosslinking thiol (e.g., a polyether, polycarbonate, polyester, polyurethane, combinations thereof, etc. multifunctional thiol with two or more thiol head groups available for covalent crosslinking). In variations of the first specific example or variations thereof the salt compound is selected from a list consisting of: lithium hexafluorophosphate ($LiPF_6$), lithium hexafluoroarsenate ($LiAsF_6$), lithium tetrafluoroborate ($LiBF_4$), lithium perchlorate ($LiClO_4$), lithium tetracyanoborate ($LiB(CN)_4$) lithium bis(fluorosulfonyl)imide (LiFSI), lithium bis(trifluorosulfonyl)imide (LiTFSI), lithium tris(trifluoromethanesulfonyl)methide (LiTFSM), lithium bis(oxalate)borate (LiBOB), lithium difluoro(oxalato)borate LiDFOB, lithium fluoroalkylphoshpates (LFAP such as lithium tris(pentafluoroethyl)trifluorophosphate), lithium-cyclo-difluoromethane-1,1-bis(sulfonyl)imide (LiDMSI), lithium-cyclo-hexafluoropropane-1,1-bis(sulfonyl)imide (LiHPSI), lithium-cyclo-hexafluoropropane-1,1-bis(sulfonyl)imide (LiBETI), lithium difluoro(oxalato)borate (LiDFOB), lithium bis(monofluoromalonato)borate (LiBFMB), lithium 4,5-dicyano-1,2,3-triazolate (LiDCTA), lithium 2-trifluoromethyl-4,5-dicyanoimidazole (LiTDI), lithium 4,5-dicyano-2-(pentafluorylethyl) imidazole (LiPDI), and combinations thereof. In variations of the first specific example or variations thereof, the composition has two states: a pre-cured liquid state, wherein the pre-cured liquid state has a viscosity of less than 40 cP at 25° C., and a freestanding state. In variations of the first specific example or variations thereof the polymer component of the pre-cured liquid state comprises subunits of the polymer compounds. In variations of the first specific example or variations thereof the active state of the composition comprises a composition with an elastic modulus of at least 0.1 MPa at 25° C. In variations of the first specific example or variations thereof, the active state of the composition a lithium cation conductivity of at least 0.1 mS/cm.

In an illustrative example of a battery system, the battery system comprises: a casing; a set of electrodes, comprising a cathode and an anode; a separator, situated between the cathode and the anode; and an electrolyte, distributed throughout the casing, comprising a polymer electrolyte that includes: a polymer component, a salt component, and an additive component. In variations of the second illustrative example or variations thereof the cathode is composed of: cathode active material selected from a list consisting of: lithium cobalt oxide (LCO), lithium nickel manganese cobalt oxide (NMC), lithium nickel manganese oxide (LNMO), lithium iron phosphate (LFP), lithium manganese oxide (LMO), and lithium nickel cobalt aluminium oxide (NCA); conductive material selected from a list consisting of: carbon black, carbon nanotubes, graphite, graphene, fullerenes, carbon fiber (VGCF), Super P Li, Super C65, Super C45, S-O, KS-6, KS-15, SFG-6, SFG-15, 350G, acetylene black, and Kezin black; and a binder selected from a list consisting of: polyvinylidene fluoride (PVDF), styrene butadiene copolymer (SBR), carboxymethyl cellulose (CMC), polyacrylic acid (PAA), poly(vinyl alcohol) (PVA), humics, poly(3,4-ethylenedioxythio-phene)-polystyrenesulfonate (PEDOT:PSS), chitosan, and alginate; the anode is composed of: anode active material selected from a list consisting of: graphite; graphitic carbon; carbon fibers; carbon nanotubes; carbon spheres; carbon nanorods; alloy materials comprising aluminium, tin, magnesium, silver, antimony, or alloys thereof; transition-metal sulfides; transition-metal oxides; transition-metal hydroxides; transition-metal phosphides; transition-metal nitrides; transition-metal carbides; transition-metal fluorides; transition-metal selenides; transition-metal oxalates; transition-metal niobates; and silicon; anode conductive material selected from a list consisting of: carbon black, carbon nanotubes, graphite, graphene, fullerenes, carbon fiber (VGCF), Super P Li, Super C65, Super C45, S-O, KS-6, KS-15, SFG-6, SFG-15, 350G, acetylene black, and Kezin black; and a binder selected from a list consisting of: polyvinylidene fluoride (PVDF), styrene butadiene copolymer (SBR), carboxymethyl cellulose (CMC), polyacrylic acid (PAA), poly(vinyl alcohol) (PVA), humics, poly(3,4-ethylenedioxythio-phene)-polystyrenesulfonate (PEDOT:PSS), chitosan, and alginate; the polymer component of the electrolyte comprises at least one of: polyester urethane acrylates, polyester urethane methacrylates, polyether urethane acrylates, polycarbonate urethane acrylates, polycarbonate-polyether urethane acrylates, polycarbonate-polyester urethane acrylates, polyether-polyester urethane acrylates, polyimide urethane acrylates, polyester acrylates, epoxy acrylates, polycarbonate acrylates, polyester-polycarbonate acrylates, polyether acrylates, polyether-polyester acrylates, polyether-polycarbonate acrylates, polyether-polyester-polycarbonate (or other orderings thereof such as polyether-polycarbonate-polyester, polyester-polyether-polycarbonate, etc.) acrylates, aminated urethane acrylates, polycarbonate urethane methacrylates, polycarbonate-polyether urethane methacrylates, polycarbonate-polyester urethane methacrylates, polyether-polyester urethane methacrylates, polyimide urethane methacrylates, polyester methacrylates, epoxy methacrylates, polycarbonate methacrylates, polyester-polycarbonate methacrylates, polyether methacrylates, polyether-polyester methacrylates, polyether-polycarbonate methacrylates, polyether-polyester-polycarbonate (or other orderings thereof such as polyether-polycarbonate-polyester, polyester-polyether-polycarbonate, etc.) methacrylates, aminated urethane acrylates, aminated urethane methacrylates, aminated urethane methacrylates, polybutadiene urethane acrylates, polybutadiene urethane methacrylates, bisphenol A epoxy diacrylate, silicone urethane acrylate, thioether dendritic acrylates, thioether dendritic methacrylates, functional aliphatic polyether urethane acrylate, difunctional aromatic urethane acrylate, or difunctional aliphatic hydrophobic urethane acrylate (in some variations of this specific example subsets of the list of materials can be selected from, for instance various urethane-containing oligomers can be selected for as a result of toughening properties arising from the urethane domain, a viscosity of the oligomer, etc.); the salt component of the electrolyte comprises at least one of lithium hexafluorophosphate (LiPF$_6$), lithium hexafluoroarsenate (LiAsF$_6$), lithium tetrafluoroborate (LiBF$_4$), lithium perchlorate (LiClO$_4$), lithium tetracyanoborate (LiB(CN)$_4$) lithium bis(fluorosulfonyl)imide (LiFSI), lithium bis(trifluorosulfonyl)imide (LiTFSI), lithium tris(trifluoromethanesulfonyl)methide (LiTFSM), lithium bis(oxalate)borate (LiBOB), lithium difluoro(oxalato)borate LiDFOB, lithium fluoroalkylphoshpates (LFAP such as lithium tris(pentafluoroethyl)trifluorophosphate), lithium-cyclo-difluoromethane-1,1-bis(sulfonyl)imide (LiDMSI), lithium-cyclo-hexafluoropropane-1,1-bis(sulfonyl)imide (LiHPSI), lithium-cyclo-hexafluoropropane-1,1-bis(sulfonyl)imide (LiBETI), lithium difluoro(oxalato)borate (LiDFOB), lithium bis(monofluoromalonato)borate (LiBFMB), lithium 4,5-dicyano-1,2,3-triazolate (LiDCTA), lithium 2-trifluoromethyl-4,5-dicyanoimidazole (LiTDI), lithium 4,5-dicyano-2-(pentafluorylethyl) imidazole (LiPDI); and the additive component of the electrolyte comprises at least one of: ethylene carbonate (EC), diethyl carbonate (DEC), dimethyl carbonate (DMC), ethyl methyl carbonate (EMC), propylene carbonate (PC), vinylene carbonate (VC), dimethoxyethane (DME), diethyl ether, tetrahydrofuran (THF), methyl formate (MF), ethyl formate (EF), methyl propionate (MP), methyl butanoate, ethyl formate (EF), ethyl acetate (EA), ethyl propionate (EP), propyl formate, propyl acetate (PA), propyl proprionate (PP), glyme, diglyme, triglyme, or tetraglyme. In variations of the second illustrative example or variations thereof, the additive component further comprises at least one of 1,3,2-dioxathiolane-2,2-dioxide (DTD), vinyl acetate (VA), 2-vinyl pyridine (VP), fluoroethylene carbonate (FEC), trivinylcyclotriboroxane (tVCBO), VC, LiDFOB, LiBOB, sulfone, ethyl methyl sulfone, tetramethyl sulfone (TMS), prop-1-ene-1,3-sulfone (PES), 1,3-propane sultone (PS), cyclic sulfate, dioxolone, 5-methyl-4-((trifluoromethoxy)methyl)-1,3-dioxol-2-one, phenyl boronic acid glycol ester (PBE), 5-methyl-4-((trimethylsilyloxy)methyl)-1,3-dioxol-2-one, trimethylphosphate (TMP), triethylphosphate (TEP), tributylphosphate (TBP), triphenylphosphate (TPP), tris(2,2,2-trifluoroethyl)phosphate (TFP), methyl P,P-bis(2,2,2-trifluoroethyl)phosphate (BMP), trimethylphosphite (TMPi), tris(2,2,2-trifluoroethyl)phosphite (TTFPi), dimethyl methyl phosphate (DMMP), diethyl ethylphosphate (DEEP), bis(2,2,2-trifluoroethyl) methylphosphate (TFMP), bis(2,2,2-trifluoroethyl) ethylphosphate (TFEP), hexa(methoxy)cyclotriphosphazene (HMOCPN), (ethoxy) pentafluorocyclotriphosphazene (PFPN), or (phenoxy) pentafluorocyclotriphosphazene (FPPN). In variations of the second illustrative example or variations thereof, an ionic conductivity of the electrolyte is at least 0.1 mS/cm at 25° C. In variations of the second illustrative example or variations thereof an elastic modulus of the electrolyte is at least 0.1 MPa at 25° C.

Figure 15:
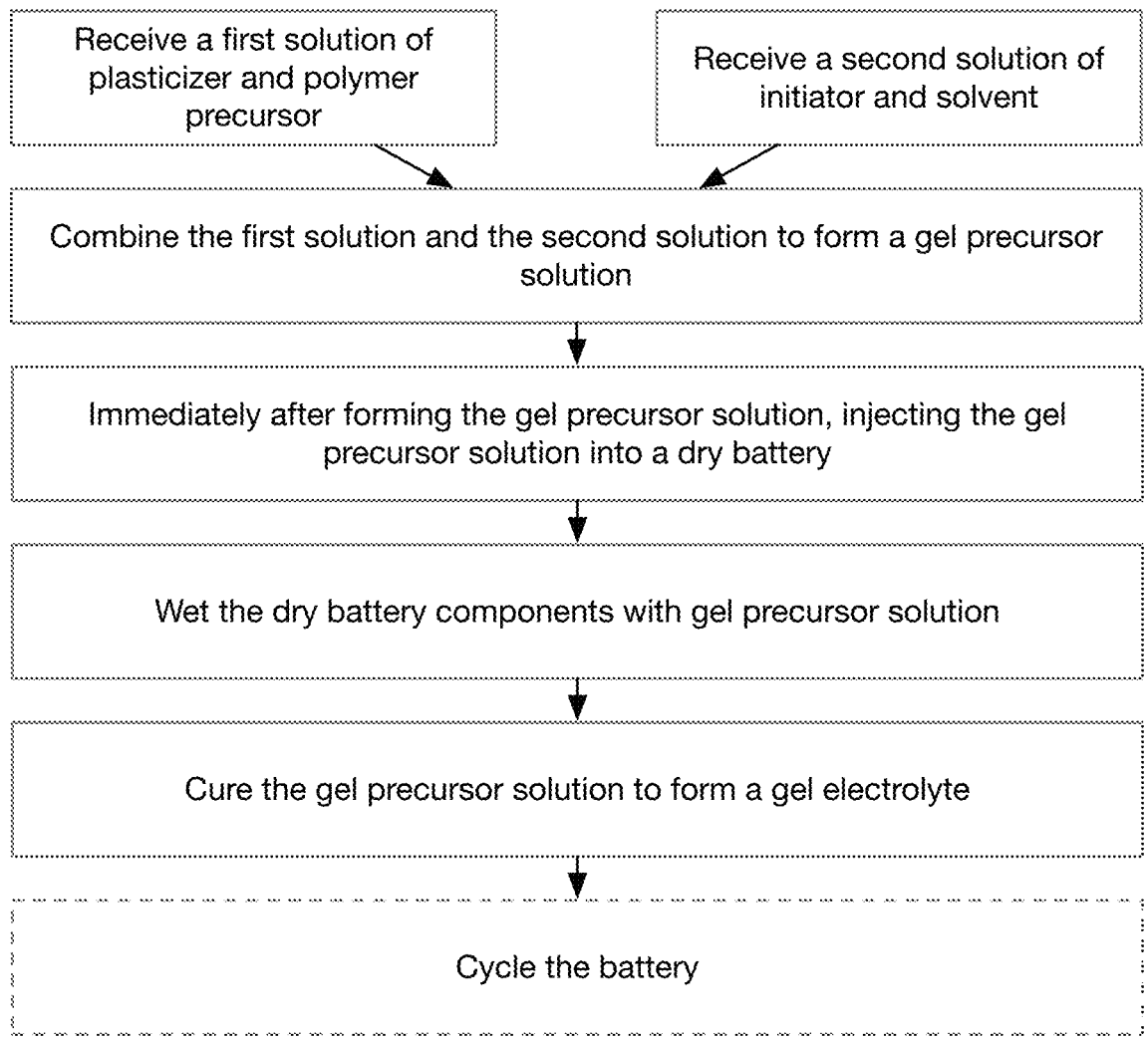
FIG. 15 is a flowchart representation of an example of curing an electrolyte precursor to form a gel electrolyte.

In a first illustrative example of a method (as shown for instance in FIG. 15), the method for an in-situ polymer electrolyte formation for a battery, comprises: preparing an electrolyte precursor, wherein the electrolyte precursor comprises monomer and oligomer subunits of at least one polymer compound at least one salt compound, and at least one additive compound; distributing the electrolyte precursor through the battery, thereby enabling wetting of the battery electrode and separator components; and activating the electrolyte precursor, thereby converting the electrolyte precursor into the polymer electrolyte. In variations of the first illustrative method example or variations thereof, activating the electrolyte precursor comprises polymerizing the at least one tough polymers in the electrolyte. In variations of the first illustrative method example or variations thereof, activating the electrolyte precursor comprises curing the electrolyte precursor. In variations of the first illustrative method example or variations thereof, comprises curing the electrolyte precursor in presence of a thermal initiator. In variations of the first illustrative method example or variations thereof, activating the electrolyte precursor occurs within the battery.

In a second illustrative method example (e.g., for in situ polymer electrolyte formation), the method for forming a gel electrolyte battery comprises: receiving a first gel precursor solution comprising a plasticizer and a polymer precursor; receiving a second gel precursor solution comprising a solvent and a polymerization initiator; mixing the first gel precursor solution and the second gel precursor solution to form a gel electrolyte precursor with a viscosity between 10 and 50 centipoise; immediately (e.g., within 30 minutes) after mixing, adding the gel electrolyte precursor to a battery; wetting a cathode, an anode, and a separator of the battery with the electrolyte precursor via pulsed vacuum wetting, wherein a vacuum pressure during each vacuum pulse is at most 0.95 Bar; at least 6 hours after wetting the cathode, the anode, and the separator of the battery; curing the gel electrolyte precursor by: fixing the battery with a force between 5-1000 psi; and heating the gel electrolyte precursor to a temperature between 60-80° C. for between 30 minutes and 24 hours; wherein after curing the gel electrolyte precursor forms a gel electrolyte throughout the cathode, the anode, and the separator. In variations of the first illustrative method example or variations thereof, the method comprises before wetting the cathode, the anode, and the separator, tap charging the battery to between 1.5 and 2.2 V. In variations of the second illustrative method example or variations thereof, the method comprises before curing the gel electrolyte cycling the battery to form a solid electrolyte interface (SEI) layer. In variations of the second specific example or variations thereof, the polymeric precursor(s) comprise at least one of a urethane acrylate or a urethane methacrylate (e.g., one or more of: polyester urethane acrylates, polyester urethane methacrylates, polyether urethane acrylates, polycarbonate urethane acrylates, polycarbonate-polyether urethane acrylates, polycarbonate-polyester urethane acrylates, polyether-polyester urethane acrylates, polyimide urethane acrylates, polycarbonate urethane methacrylates, polycarbonate-polyether urethane methacrylates, polycarbonate-polyester urethane methacrylates, polyether-polyester urethane methacrylates, polyimide urethane methacrylates, polybutadiene urethane acrylates, polybutadiene urethane methacrylates, bisphenol A epoxy diacrylate, silicone urethane acrylate, thioether dendritic acrylates, thioether dendritic methacrylates, functional aliphatic polyether urethane acrylate, difunctional aromatic urethane acrylate, difunctional aliphatic hydrophobic urethane acrylate, aminated urethane acrylates, aminated urethane methacrylates). In other variations of the second specific example or variations thereof, the polymeric precursor(s) comprise at least one of a urethane epoxy or a urea epoxy and optionally a crosslinking epoxy (e.g., a polyether, polycarbonate, polyester, polyurethane, combinations thereof, etc. multifunctional epoxy with two or more epoxy head groups available for covalent crosslinking). In other variations of the second specific example or variations thereof, the polymeric precursor(s) comprise at least one of a urethane imide or a urea imide and optionally a crosslinking imide (e.g., a polyether, polycarbonate, polyester, polyurethane, combinations thereof, etc. multifunctional imide with two or more imide head groups available for covalent crosslinking). In other variations of the second specific example or variations thereof, the polymeric precursor(s) comprise at least one of a urethane thiol or a urea thiol and optionally a crosslinking thiol (e.g., a polyether, polycarbonate, polyester, polyurethane, combinations thereof, etc. multifunctional thiol with two or more thiol head groups available for covalent crosslinking). In variations of the second illustrative method example or variations thereof, the plasticizer comprises: a polar aprotic solvent comprising at least one of ethylene carbonate, fluoroethylene carbonate, propylene carbonate, vinylene carbonate, trimethylene carbonate, 1,2-butylene carbonate, 2,3-butylene carbonate, trifluoropropylene carbonate, methylene ethylene carbonate, dioxazolone, hexahydroxybenzene triscarbonate, ethylenetetracarboxylic dianhydride, lactic acid O-carboxyanhydride, tetrahydroxy-1,4-benzoquinone biscarbonate, di-tert-butyl carbonate, di-tert-butyl decarbonate, diethyl carbonate, diethyl pyrocarbonate, dimethyl carbonate, ethyl methyl carbonate, diallyl carbonate, diphenyl carbonate, methyl(2,2,2-trifluoroethyl) carbonate, bis(2,2,2-trifluoroethyl) carbonate, dimethoxyethane, diethyl ether, tetrahydrofuran (oxolane), tetraethoxymethane, tetramethoxymethane, triethyl orthoacetate, triethyl orthoformate, trimethylorthoformate, 2,2-diethoxytetrahydrofuran, methyl formate, ethyl formate, methyl propionate, methyl butanoate, ethyl formate, ethyl acetate, ethyl propionate, propyl formate, propyl acetate, or propyl proprionate; and a salt comprising at least one of lithium hexafluorophosphate, lithium hexafluoroarsenate, lithium tetrafluoroborate, lithium chlorate, lithium 2,3,7,8-tetraoxo-1,4,6,9-tetraoxa-5-boraspiro[4.4]nonan-5-uide, lithium difluorophosphate, lithium difluorooxalatoborate, lithium bis(fluorosulfonyl)imide, lithium bis(trifluoromethanesulfonyl)imide, lithium-cyclo-difluoromethane-1,1-bis(sulfonyl)imide, lithium fluoromalonato(difluoro)borate, lithium trifluoromethanesulfonate, lithium tetraoxo-1,4,6,9-tetraoxa-5-boraspiro[4.4]nonan-5-uide, lithium trifluoro[(trifluoromethansulfonylazanidyl)sulfonyl]methane, lithium nitrate, or lithium 2,2-difluoro-4,5-dioxo-1,3,2-dioxaborolane-2-uide. In variations of the second illustrative method example or variations thereof, the solvent is the polar aprotic solvent.

In a third illustrative method example, the method comprises: receiving a gel electrolyte precursor solution comprising: an oligomer comprising a functional group capable of dynamic bonding (e.g., hydrogen bonding, ion pair bonding, metal chelating, dynamic covalent bonding, etc.) and/or a toughening domain (toughening region, toughening functional groups, etc. typically enabled by functional groups capable of dynamic bonding); an initiator; and a plasticizer; adding the gel electrolyte precursor solution to a battery stack comprising a cathode, an anode, and a separator; wetting the battery stack with the gel electrolyte precursor solution; and curing the gel electrolyte precursor solution to form a covalently bonded gel electrolyte network interspersed throughout the cathode, the anode, and the separator. In variations of the third illustrative method example or variations thereof, a viscosity of the gel electrolyte precursor is at most 50 cP at 25° C. In variations of the third illustrative method example or variations thereof, the covalently bonded gel electrolyte network comprises ionically conductive domains. In variations of the third illustrative method example or variations thereof, the plasticizer comprises: a polar aprotic solvent comprising at least one of ethylene carbonate, fluoroethylene carbonate, propylene carbonate, vinylene carbonate, trimethylene carbonate, 1,2-butylene carbonate, 2,3-butylene carbonate, trifluoropropylene carbonate, methylene ethylene carbonate, dioxazolone, hexahydroxybenzene triscarbonate, ethylenetetracarboxylic dianhydride, lactic acid O-carboxyanhydride, tetrahydroxy-1,4-benzoquinone biscarbonate, di-tert-butyl carbonate, di-tert-butyl decarbonate, diethyl carbonate, diethyl pyrocarbonate, dimethyl carbonate, ethyl methyl carbonate, diallyl carbonate, diphenyl carbonate, methyl(2,2,2-trifluoroethyl) carbonate, bis(2,2,2-trifluoroethyl) carbonate, dimethoxyethane, diethyl ether, tetrahydrofuran (oxolane), tetraethoxymethane, tetramethoxymethane, triethyl orthoacetate, triethyl orthoformate, trimethyl orthoformate, 2,2-diethoxytetrahydrofuran, methyl formate, ethyl formate, methyl propionate, methyl butanoate, ethyl formate, ethyl acetate, ethyl propionate, propyl formate, propyl acetate, or propyl propionate; and a salt comprising at least one of lithium hexafluorophosphate, lithium hexafluoroarsenate, lithium tetrafluoroborate, lithium chlorate, lithium 2,3,7,8-tetraoxo-1,4,6,9-tetraoxa-5-boraspiro[4.4]nonan-5-uide, lithium difluorophosphate, lithium difluorooxalatoborate, lithium bis(fluorosulfonyl)imide, lithium bis(trifluoromethanesulfonyl)imide, lithium-cyclo-difluoromethane-1,1-bis(sulfonyl)imide, lithium fluoromalonato(difluoro)borate, lithium trifluoromethanesulfonate, lithium tetraoxo-1,4,6,9-tetraoxa-5-boraspiro[4,4]nonan-5-uide, lithium trifluoro[(trifluoromethansulfonylazanidyl)sulfonyl]methane, lithium nitrate, or lithium 2,2-difluoro-4,5-dioxo-1,3,2-dioxaborolane-2-uide. In variations of the third illustrative method example or variations thereof, the plasticizer further comprises an additive comprising at least one of fluoroethylene carbonate, vinylene carbonate, methylene ethylene carbonate, 3-fluoro-1,3-propanesultone, prop-1-ene-1,3-sultone, trimethyl phosphate, triethyl phosphate, tributyl phosphate, triphenyl phosphate, tris(2,2,2-trifluorethyl) phosphate, bis(2,2,2-trifluoroethyl) methyl phosphate, trimethylphosphite, triethyl phosphite, tributyl phosphite, tris(2,2,2-trifluorethyl) phosphite, dimethyl methylphosphonate, diethyl ethylphosphonate, bis(2,2,2-trifluoroethyl) methylphosphonate, bis(2,2,2-trifluoroethyl) ethylphosphonate, hexamethoxycyclotriphosphazene, N-methyl-2-pyrrolidone, ethoxy(pentafluoro)cyclotriphosphazene, pentafluoro(phenoxy)cyclotriphosphazene, tris(trimethylsilyl) phosphite, tris(trimethylsilyl)phosphate, or diethyl phenylphosphonite. In variations of the third illustrative method example or variations thereof, receiving a gel electrolyte precursor comprises mixing a first solution comprising the plasticizer and the oligomer with a third solution comprising the initiator and a solvent. In variations of the third illustrative method example or variations thereof, the first solution and the second solution are mixed immediately (e.g., at most 1 hour) before adding the gel electrolyte precursor solution to the battery stack. In variations of the third illustrative method example or variations thereof, the plasticizer comprises the solvent. In variations of the third illustrative method example or variations thereof, curing the gel electrolyte precursor comprises thermally curing the gel electrolyte precursor by maintaining a temperature of the gel electrolyte precursor and the battery stack between 60 and 80° C. for between 0.5 and 24 hours. In variations of the third illustrative method example or variations thereof, curing the gel electrolyte precursor comprises mechanically fixing the gel electrolyte precursor and the battery stack with a pressure between 5 psi and 1000 psi. In variations of the third specific example or variations thereof, the oligomer comprises at least one of a urethane epoxy or a urea epoxy and optionally a crosslinking epoxy (e.g., a polyether, polycarbonate, polyester, polyurethane, combinations thereof, etc. multifunctional epoxy with two or more epoxy head groups available for covalent crosslinking). In other variations of the third specific example or variations thereof, the oligomer comprises at least one of a urethane acrylate or a urethane methacrylate (e.g., one or more of: polyester urethane acrylates, polyester urethane methacrylates, polyether urethane acrylates, polycarbonate urethane acrylates, polycarbonate-polyether urethane acrylates, polycarbonate-polyester urethane acrylates, polyether-polyester urethane acrylates, polyimide urethane acrylates, polycarbonate urethane methacrylates, polycarbonate-polyether urethane methacrylates, polycarbonate-polyester urethane methacrylates, polyether-polyester urethane methacrylates, polyimide urethane methacrylates, polybutadiene urethane acrylates, polybutadiene urethane methacrylates, bisphenol A epoxy diacrylate, silicone urethane acrylate, thioether dendritic acrylates, thioether dendritic methacrylates, functional aliphatic polyether urethane acrylate, difunctional aromatic urethane acrylate, difunctional aliphatic hydrophobic urethane acrylate, aminated urethane acrylates, aminated urethane methacrylates). In other variations of the third specific example or variations thereof, the oligomer comprises at least one of a urethane imide or a urea imide and optionally a crosslinking imide (e.g., a polyether, polycarbonate, polyester, polyurethane, combinations thereof, etc. multifunctional imide with two or more imide head groups available for covalent crosslinking). In other variations of the third specific example or variations thereof, the oligomer comprises at least one of a urethane thiol or a urea thiol and optionally a crosslinking thiol (e.g., a polyether, polycarbonate, polyester, polyurethane, combinations thereof, etc. multifunctional thiol with two or more thiol head groups available for covalent crosslinking). In variations of the third illustrative method example or variations thereof, the covalently bonded gel electrolyte network comprises at least one functional group that forms an ionic transport network. In variations of the third illustrative method example or variations thereof, the oligomer and/or polymer formed by activating (e.g., curing, polymerizing, etc. the oligomer and/or monomers) comprises at least one functional group (e.g., repeating monomers comprising said functional group, pendant groups, etc.) selected from: carbonate, ester, ketone, carbamide, carbamate, thiocarbamate, thiocarbamide, thiocarbonate, dithiocarbonate, ether, thioether, imide, imine, epoxide, amide, acid anhydride, nitrile, amidine, cyanate, isocyanate, nitrosooxy, nitro, nitroso, oxime, sulfinyl, sulfonyl, sulfonate ester, sulfone, thiocyanate, isothiocyanate, thioester, or dithiocarboxylic acid ester within a backbone of the oligomer. In variations of the third illustrative method example or variations thereof, the method comprises prior to wetting the battery stack, tap charging the battery stack to a voltage between 1.5 and 2.2 V. In variations of the third illustrative method example or variations thereof, wetting the battery stack comprises applying a plurality of vacuum pulses (e.g., 2, 3, 4, 5, 7, 10, 20, 50, values or ranges therebetween etc. pulses) to the battery stack, wherein each vacuum pulse of the plurality of vacuum pulses comprises a pressure of at most about 0.95 Bar. In other variations, a single vacuum pulse could be used. In variations of the third illustrative method example or variations thereof, wetting the battery stack further comprises aging the battery stack for up to 48 hours before curing the gel electrolyte precursor.

We claim:

1. A method for forming a gel electrolyte battery comprising:
   receiving a first gel precursor solution comprising a plasticizer and a polymer precursor;
   receiving a second gel precursor solution comprising a solvent and a polymerization initiator;
   mixing the first gel precursor solution and the second gel precursor solution to form a gel electrolyte precursor with a viscosity between 10 and 50 centipoise;
   immediately after mixing, adding the gel electrolyte precursor to a battery;
   wetting a cathode, an anode, and a separator of the battery with the electrolyte precursor via pulsed vacuum wetting, wherein a vacuum pressure during each vacuum pulse is at most 0.95 Bar;
   at least 6 hours after wetting the cathode, the anode, and the separator of the battery; curing the gel electrolyte precursor by:
   fixing the battery with a force between 5-1000 psi; and
   heating the gel electrolyte precursor to a temperature between 60-80° C. for between 30 minutes and 24 hours;
   wherein after curing the gel electrolyte precursor forms a gel electrolyte throughout the cathode, the anode, and the separator.

2. The method of claim 1, further comprising before wetting the cathode, the anode, and the separator, tap charging the battery to between 1.5 and 2.2 V.

3. The method of claim 1, further comprising before curing the gel electrolyte cycling the battery to form a solid electrolyte interface (SEI) layer.

4. The method of claim 1, wherein the polymer precursor comprises a urethane acrylate or a urethane methacrylate oligomer.

5. The method of claim 1, wherein the plasticizer comprises:
   a polar aprotic solvent comprising at least one of ethylene carbonate, fluoroethylene carbonate, propylene carbonate, vinylene carbonate, trimethylene carbonate, 1,2-butylene carbonate, 2,3-butylene carbonate, trifluoropropylene carbonate, methylene ethylene carbonate, dioxazolone, hexahydroxybenzene triscarbonate, ethylenetetracarboxylic dianhydride, lactic acid O-carboxyanhydride, tetrahydroxy-1,4-benzoquinone biscarbonate, di-tert-butyl carbonate, di-tert-butyl decarbonate, diethyl carbonate, diethyl pyrocarbonate, dimethyl carbonate, ethyl methyl carbonate, diallyl carbonate, diphenyl carbonate, methyl(2,2,2-trifluoroethyl) carbonate, bis(2,2,2-trifluoroethyl) carbonate, dimethoxyethane, diethyl ether, tetrahydrofuran (oxolane), tetraethoxymethane, tetramethoxymethane, triethyl orthoacetate, triethyl orthoformate, trimethylorthoformate, 2,2-diethoxytetrahydrofuran, methyl formate, ethyl formate, methyl propionate, methyl butanoate, ethyl formate, ethyl acetate, ethyl propionate, propyl formate, propyl acetate, or propyl propionate; and a salt comprising at least one of lithium hexafluorophosphate, lithium hexafluoroarsenate, lithium tetrafluoroborate, lithium chlorate, lithium 2,3,7,8-tetraoxo-1,4,6,9-tetraoxa-5-boraspiro[4.4]nonan-5-uide, lithium difluorophosphate, lithium bis(fluorosulfonyl)imide, lithium bis(trifluoromethanesulfonyl)imide, lithium-cyclo-difluoromethane-1,1-bis(sulfonyl)imide, lithium fluoromalonato(difluoro)borate, lithium trifluoromethanesulfonate, lithium tetraoxo-1,4,6,9-tetraoxa-5-boraspiro[4.4]nonan-5-uide, lithium trifluoro[(trifluoromethansulfonylazanidyl)sulfonyl]methane, lithium nitrate, or lithium 2,2-difluoro-4,5-dioxo-1,3,2-dioxaborolane-2-uide.

6. The method of claim 5, wherein the solvent in the step of receiving a second gel precursor solution is the polar aprotic solvent.

7. A method comprising:
receiving a gel electrolyte precursor solution comprising:
an acrylate oligomer or a methacrylate oligomer comprising a toughening region;
an initiator; and
a plasticizer;
adding the gel electrolyte precursor solution to a battery stack comprising a cathode, an anode, and a separator;
wetting the battery stack with the gel electrolyte precursor solution;
prior to or during wetting the battery stack, tap charging the battery stack to a voltage between 1.5 and 2.2 V; and
curing the gel electrolyte precursor solution to form a covalently bonded gel electrolyte network interspersed throughout the cathode, the anode, and the separator.

8. The method of claim 7, wherein a viscosity of the gel electrolyte precursor is at most 50 cP at 25° C.

9. The method of claim 7, wherein the covalently bonded gel electrolyte network has an ionic conductivity of at least 0.1 mS/cm at 25° C.

10. The method of claim 7, wherein the plasticizer comprises:
a polar aprotic solvent comprising at least one of ethylene carbonate, propylene carbonate, trimethylene carbonate, 1,2-butylene carbonate, 2,3-butylene carbonate, trifluoropropylene carbonate, dioxazolone, hexahydroxybenzene triscarbonate, ethylenetetracarboxylic dianhydride, lactic acid O-carboxyanhydride, tetrahydroxy-1,4-benzoquinone biscarbonate, di-tert-butyl carbonate, di-tert-butyl decarbonate, diethyl carbonate, diethyl pyrocarbonate, dimethyl carbonate, ethyl methyl carbonate, diallyl carbonate, diphenyl carbonate, methyl(2,2,2-trifluoroethyl) carbonate, bis(2,2,2-trifluoroethyl) carbonate, dimethoxyethane, diethyl ether, tetrahydrofuran (oxolane), tetraethoxymethane, tetramethoxymethane, triethyl orthoacetate, triethyl orthoformate, trimethyl orthoformate, 2,2-diethoxytetrahydrofuran, methyl formate, ethyl formate, methyl propionate, methyl butanoate, ethyl formate, ethyl acetate, ethyl propionate, propyl formate, propyl acetate, or propyl propionate; and
a salt comprising at least one of lithium hexafluorophosphate, lithium hexafluoroarsenate, lithium tetrafluoroborate, lithium chlorate, lithium 2,3,7,8-tetraoxo-1,4,6,9-tetraoxa-5-boraspiro[4.4]nonan-5-uide, lithium difluorophosphate, lithium bis(fluorosulfonyl)imide, lithium bis(trifluoromethanesulfonyl)imide, lithium-cyclo-difluoromethane-1,1-bis(sulfonyl)imide, lithium fluoromalonato(difluoro)borate, lithium trifluoromethanesulfonate, lithium tetraoxo-1,4,6,9-tetraoxa-5-boraspiro[4.4]nonan-5-uide, lithium trifluoro[(trifluoromethansulfonylazanidyl)sulfonyl]methane, lithium nitrate, or lithium 2,2-difluoro-4,5-dioxo-1,3,2-dioxaborolane-2-uide.

11. The method of claim 10, wherein the plasticizer further comprises an additive comprising at least one of fluoroethylene carbonate, vinylene carbonate, methylene ethylene carbonate, 3-fluoro-1,3-propanesultone, prop-1-ene-1,3-sultone, trimethyl phosphate, triethyl phosphate, tributyl phosphate, triphenyl phosphate, tris(2,2,2-trifluoroethyl) phosphate, bis(2,2,2-trifluoroethyl) methyl phosphate, trimethylphosphite, triethyl phosphite, tributyl phosphite, tris(2,2,2-trifluorethyl) phosphite, dimethyl methylphosphonate, diethyl ethylphosphonate, bis(2,2,2-trifluoroethyl) methylphosphonate, bis(2,2,2-trifluoroethyl) ethylphosphonate, hexamethoxycyclotriphosphazene, N-methyl-2-pyrrolidone, ethoxy(pentafluoro)cyclotriphosphazene, pentafluoro(phenoxy)cyclotriphosphazene, tris(trimethylsilyl) phosphite, tris(trimethylsilyl)phosphate, or diethyl phenylphosphonite.

12. The method of claim 7, wherein receiving a gel electrolyte precursor comprises mixing a first solution comprising the plasticizer and the acrylate oligomer or the methacrylate oligomer with a second solution comprising the initiator and a solvent.

13. The method of claim 12, wherein the first solution and the second solution are mixed immediately before adding the gel electrolyte precursor solution to the battery stack.

14. The method of claim 12, wherein the plasticizer comprises the solvent.

15. The method of claim 7, wherein curing the gel electrolyte precursor comprises thermally curing the gel electrolyte precursor by maintaining a temperature of the gel electrolyte precursor and the battery stack between 6° and 80° C. for between 0.5 and 24 hours.

16. The method of claim 15, wherein curing the gel electrolyte precursor comprises mechanically fixing the gel electrolyte precursor and the battery stack with a pressure between 5 psi and 1000 psi.

17. The method of claim 7, wherein the toughening region comprises a functional group capable of dynamic bonding via hydrogen bonding or ion pairing interactions.

18. The method of claim 7, wherein the covalently bonded gel electrolyte network further comprises at least one functional group that forms an ionic transport network.

19. The method of claim 18, wherein the at least one functional group comprises at least one functional group selected from: carbonate, ester, ketone, carbamide, carbamate, thiocarbamate, thiocarbamide, thiocarbonate, dithiocarbonate, ether, thioether, imide, imine, epoxide, amide, acid anhydride, nitrile, amidine, cyanate, isocyanate, nitrosooxy, nitro, nitroso, oxime, sulfinyl, sulfonyl, sulfonate ester, sulfone, thiocyanate, isothiocyanate, thioester, or dithiocarboxylic acid ester within a backbone of the acrylate oligomer or the methacrylate oligomer.

20. The method of claim 7, wherein wetting the battery stack comprises applying a plurality of vacuum pulses to the battery stack, wherein each vacuum pulse of the plurality of vacuum pulses comprises a pressure of at most about 0.95 Bar.

21. The method of claim 7, wherein wetting the battery stack further comprises aging the battery stack for up to 48 hours before curing the gel electrolyte precursor.

22. A method comprising:
receiving a gel electrolyte precursor solution comprising:
an acrylate oligomer or a methacrylate oligomer comprising a toughening region;
an initiator; and
a plasticizer;
adding the gel electrolyte precursor solution to a battery stack comprising a cathode, an anode, and a separator;
wetting the battery stack with the gel electrolyte precursor solution; and
thermally curing the gel electrolyte precursor solution to form a covalently bonded gel electrolyte network interspersed throughout the cathode, the anode, and the separator by maintaining a temperature of the gel electrolyte precursor and the battery stack between 6° and 80° C. for between 0.5 and 24 hours and mechanically fixing the gel electrolyte precursor and the battery stack with a pressure between 5 psi and 1000 psi.

23. The method of claim 22, wherein the plasticizer comprises:
a polar aprotic solvent comprising at least one of ethylene carbonate, propylene carbonate, trimethylene carbonate, 1,2-butylene carbonate, 2,3-butylene carbonate, trifluoropropylene carbonate, dioxazolone, hexahydroxybenzene triscarbonate, ethylenetetracarboxylic dianhydride, lactic acid O-carboxyanhydride, tetrahydroxy-1,4-benzoquinone biscarbonate, di-tert-butyl carbonate, di-tert-butyl decarbonate, diethyl carbonate, diethyl pyrocarbonate, dimethyl carbonate, ethyl methyl carbonate, diallyl carbonate, diphenyl carbonate, methyl(2,2,2-trifluoroethyl) carbonate, bis(2,2,2-trifluoroethyl) carbonate, dimethoxyethane, diethyl ether, tetrahydrofuran (oxolane), tetraethoxymethane, tetramethoxymethane, triethyl orthoacetate, triethyl orthoformate, trimethyl orthoformate, 2,2-diethoxytetrahydrofuran, methyl formate, ethyl formate, methyl propionate, methyl butanoate, ethyl formate, ethyl acetate, ethyl propionate, propyl formate, propyl acetate, or propyl propionate; and
a salt comprising at least one of lithium hexafluorophosphate, lithium hexafluoroarsenate, lithium tetrafluoroborate, lithium chlorate, lithium 2,3,7,8-tetraoxo-1,4,6,9-tetraoxa-5-boraspiro[4.4]nonan-5-uide, lithium difluorophosphate, lithium bis(fluorosulfonyl)imide, lithium bis(trifluoromethanesulfonyl)imide, lithium-cyclo-difluoromethane-1,1-bis(sulfonyl)imide, lithium fluoromalonato(difluoro)borate, lithium trifluoromethanesulfonate, lithium tetraoxo-1,4,6,9-tetraoxa-5-boraspiro[4,4]nonan-5-uide, lithium trifluoro[(trifluoromethansulfonylazanidyl)sulfonyl]methane, lithium nitrate, or lithium 2,2-difluoro-4,5-dioxo-1,3,2-dioxaborolane-2-uide.

24. The method of claim 22, wherein the toughening region comprises a functional group capable of dynamic bonding via hydrogen bonding or ion pairing interactions.

25. The method of claim 22, wherein the covalently bonded gel electrolyte network further comprises at least one functional group that forms an ionic transport network.

26. The method of claim 25, wherein the at least one functional group comprises at least one functional group selected from: carbonate, ester, ketone, carbamide, carbamate, thiocarbamate, thiocarbamide, thiocarbonate, dithiocarbonate, ether, thioether, imide, imine, epoxide, amide, acid anhydride, nitrile, amidine, cyanate, isocyanate, nitrosooxy, nitro, nitroso, oxime, sulfinyl, sulfonyl, sulfonate ester, sulfone, thiocyanate, isothiocyanate, thioester, or dithiocarboxylic acid ester within a backbone of the acrylate oligomer or the methacrylate oligomer.

27. The method of claim 22, wherein wetting the battery stack comprises applying a plurality of vacuum pulses to the battery stack, wherein each vacuum pulse of the plurality of vacuum pulses comprises a pressure of at most about 0.95 Bar.

28. The method of claim 22, wherein wetting the battery stack further comprises aging the battery stack for up to 48 hours before curing the gel electrolyte precursor.

* * * * *